(12) United States Patent
Grondin et al.

(10) Patent No.: US 8,886,617 B2
(45) Date of Patent: Nov. 11, 2014

(54) QUERY-BASED SEARCHING USING A VIRTUAL TABLE

(71) Applicant: Informatica Corporation, Redwood City, CA (US)

(72) Inventors: Richard Grondin, Ste-Julie (CA); Vassili Zarouba, Brossard (CA)

(73) Assignee: Informatica Corporation, Redwood City, CA (US)

( * ) Notice: Subject to any disclaimer, the term of this patent is extended or adjusted under 35 U.S.C. 154(b) by 0 days.

(21) Appl. No.: 13/891,190

(22) Filed: May 9, 2013

(65) Prior Publication Data

US 2013/0254171 A1 Sep. 26, 2013

Related U.S. Application Data

(60) Continuation-in-part of application No. 13/725,430, filed on Dec. 21, 2012, which is a continuation of application No. 11/746,583, filed on May 9, 2007, now Pat. No. 8,386,435, which is a division of application No. 10/783,643, filed on Feb. 20, 2004, now Pat. No. 7,243,110.

(51) Int. Cl.
*G06F 7/00* (2006.01)
*G06F 17/30* (2006.01)

(52) U.S. Cl.
CPC .... *G06F 17/30477* (2013.01); *G06F 17/30566* (2013.01); *Y10S 707/99953* (2013.01); *Y10S 707/99943* (2013.01); *Y10S 707/99942* (2013.01)
USPC ............. 707/693; 707/999.202; 707/999.102; 707/999.101

(58) Field of Classification Search
USPC ......................................................... 707/693
See application file for complete search history.

(56) References Cited

U.S. PATENT DOCUMENTS

| | | | |
|---|---|---|---|
| 5,036,457 | A | 7/1991 | Glaser et al. |
| 5,574,906 | A | 11/1996 | Morris |
| 5,704,060 | A | 12/1997 | Del Monte |
| 5,835,667 | A | 11/1998 | Wactlar et al. |
| 6,070,164 | A | 5/2000 | Vagnozzi |

(Continued)

FOREIGN PATENT DOCUMENTS

| | | |
|---|---|---|
| EP | 1 152 352 A2 | 11/2001 |
| WO | WO 01/59613 A2 | 8/2001 |

OTHER PUBLICATIONS

Babu et al., *A Model-Based Semantic Compression System for Massive Data Tables*, May 21-24, 2001, pp. 283-294, ACM SIGMOD, Santa Barbara, USA.

(Continued)

*Primary Examiner* — Rehana Perveen
*Assistant Examiner* — Raheem Hoffler
(74) *Attorney, Agent, or Firm* — Fenwick & West LLP

(57) ABSTRACT

A method of searching all tables in a data model is disclosed, using a non-materializing virtual table interface that acts as a view into the underlying data model. The virtual table is virtually built on the fly at query execution time, and maps to all columns and rows within the data model. A query on the virtual table is translated into a set of data model queries for searching the data model, based on columns selected from the virtual table and other specified search parameters, as well as the virtual table definition. The search process works in conjunction with data domains, and uses compaction and tokenization of data.

25 Claims, 16 Drawing Sheets

(56) References Cited

U.S. PATENT DOCUMENTS

| | | |
|---|---|---|
| 6,976,053 B1 | 12/2005 | Tripp et al. |
| 7,353,236 B2 | 4/2008 | Stickler |
| 7,720,878 B2 | 5/2010 | Caldwell et al. |
| 2002/0065800 A1 | 5/2002 | Morlitz |
| 2002/0123999 A1 | 9/2002 | Bankert et al. |
| 2003/0001930 A1 | 1/2003 | Nakata et al. |
| 2003/0093434 A1 | 5/2003 | Stickler |
| 2004/0220980 A1 | 11/2004 | Forster |
| 2004/0225688 A1 | 11/2004 | Thaler et al. |
| 2005/0027756 A1 | 2/2005 | Pettigrew |
| 2005/0033733 A1 | 2/2005 | Shadmon et al. |
| 2005/0055372 A1 | 3/2005 | Springer, Jr. et al. |
| 2005/0138000 A1 | 6/2005 | Roux et al. |
| 2005/0165838 A1 | 7/2005 | Fontoura et al. |
| 2006/0143180 A1 | 6/2006 | Peterson et al. |

OTHER PUBLICATIONS

Baeza-Yates et al., *Block Addressing Indices for Approximate Text Retrieval*, 1997, pp. 1-8, CIKM, Las Vegas.

Cannane et al, *A General-Purpose Compression Scheme for Large Collections*, Jul. 2002, pp. 329-355, vol. 20, No. 3, ACM Transactions on Information Systems.

Copeland et al., *A Decomposition Storage Model*, pp. 268-279, Microelectronics and Technology Computer Corporation, 1985, Austin, USA.

Corworks, *Corworks Knowledge Server*, four pages, Stamford.

Datz, *Emerging Technology, Innovation and Products in the Vanguard Company to Watch Corworks: Data Diets*, CIO Magazine, Jan. 1, 2003 issue, two pages, Stamford.

European Patent Office, European Search Report, EP App. No. 05250356.2, transmitted Oct. 6, 2006, dated Sep. 21, 2006, two pages.

Goldstein et al., *Compressing Relations and Indexes*, Jun. 18, 1997, pp. 1-23, University of Wisconsin, Madison.

Hoss, *Top Ten Trends in Data Warehousing*, dataWarehouse.com, Oct. 30, 2001, five pages.

Lindstrom, *Log Management: The Foundation of Network Security*; A Spire Research Report, Jan. 2003, eleven pages, Spire Security, LLC, Malvern.

Navarro et al., *Adding Compression to Block Addressing Inverted Indexes*, Feb. 15, 2000, pp. 1-36, Kluwer Academic, Netherlands.

Ng, et al., *Relational Database Compression Using Augmented Vector Quantization*, 11th IEEE International Conference on Data Engineering, Mar. 6-10, 1995, pp. 1-10, Taipei.

Poess et al., *Data Compression in Oracle*, 29th VLDB Conference, 2003, eleven pages, Berlin.

Scholer, *Compression of Inverted Indexes for Fast Query Evaluation*, Aug. 11-15, 2002, pp. 222-229, SGIR.

*The Daytona*, Jan. 23, 2004, pp. 1-44, http://www.research.att.com/projects/daytona.

Vo et al., *Compressed Inverted Files with Reduced Decoding Overheads*, 1998 pp. 290-297, SIGIR, Melbourne, Australia.

Williams et al., *Compressing Integers for Fast File Access*, The Computer Journal, 1999, pp. 193-201, vol. 42, No. 3.

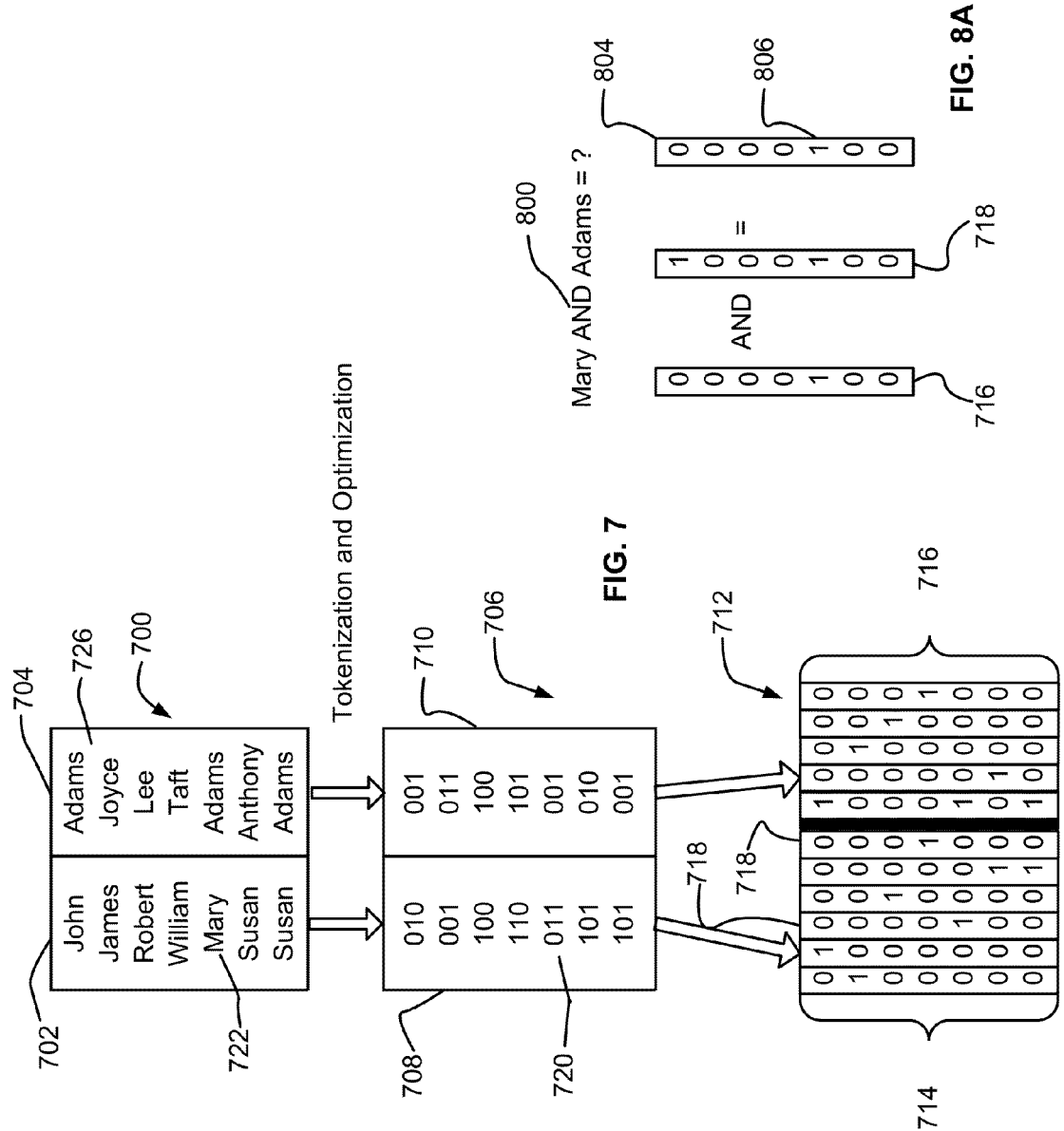

| URowID | C1 | C2 |
|---|---|---|
| 00023 | ABC10DEF23 | 11111111 |
| 00024 | ABC210DE11 | 00000010 |
| 00025 | ABCDEFGHIJ | 00100100 |

T2

| URowID | CC1 | CC2 |
|---|---|---|
| 00010 | ABC10DAB23 | A10BCD |
| 00011 | ABC222DE11 | ABCDEF |
| 00012 | ABCFFFGHIJ | ABCD10 |

T3

| URowID | CCC1 | CCC2 | CCC3 |
|---|---|---|---|
| 00111 | ABC23DEF23 | 00000010 | DDDD10 |
| 00112 | ABC213DE10 | 10101000 | DDEDED |
| 00113 | 123ABCDE11 | 01010101 | DECDEC |

FIG. 14

| Schema | Table | Column | URowID | Value |
|--------|-------|--------|--------|-------|
| ABC | T1 | C1 | 00023 | ABC10DEF23 |
| ABC | T1 | C1 | 00024 | ABC210DE11 |
| ABC | T2 | CC1 | 00010 | ABC10DAB23 |
| XYZ | T3 | CCC1 | 00112 | ABC213DE10 |
| ABC | T1 | C2 | 00024 | 00000010 |
| XYZ | T3 | CCC2 | 00111 | 00000010 |
| ABC | T2 | CC2 | 00010 | A10BCD |
| ABC | T2 | CC2 | 00012 | ABCD10 |
| XYZ | T3 | CCC3 | 00111 | DDDD10 |

FIG. 15

QUERY-BASED SEARCHING USING A VIRTUAL TABLE

CROSS REFERENCE TO RELATED APPLICATIONS

This application is a continuation-in-part of U.S. patent application Ser. No. 13/725,430 filed on Dec. 21, 2012, which is a continuation of U.S. patent application Ser. No. 11/746,583 filed on May 9, 2007, now U.S. Pat. No. 8,386,435, issued Feb. 26, 2013, which is a divisional of U.S. patent application Ser. No. 10/783,643 filed Feb. 20, 2004, now U.S. Pat. No. 7,243,110, issued Jul. 10, 2007, the contents of which are herein incorporated by reference.

BACKGROUND

The present invention pertains generally to the field of database querying. Many business enterprises generate large amounts of electronic data that are archived for a variety of purposes. Examples include archiving transaction data for auditing, customer service or data mining uses. A business enterprise may also be required to archive electronic data for regulatory purposes.

The enterprise data typically is created and stored within one or more data warehouses spread out over multiple tables in a database or multiple databases. Searching these multiple sources typically requires that the data storage is built and indexed in full, at which point queries can be run against the data, often in a piecemeal format querying each column of the database. Thus, queries of all tables in a database or across database often requires knowledge of the underlying database structure, maintenance to keep tables in sync, pre-processing, and index building. In addition, queries using a typical model often require heavy processing and are redundant over data common between the tables. In the context of keyword searching, searches alternatively can be performed on documents, but this process requires data extraction and synchronization to ensure data integrity.

SUMMARY

A method of searching all tables in a database uses a non-materializing virtual table interface that acts as a view into the underlying data model of the database. In this way, multiple tables can be consolidated into a virtual table without having to build and maintain a new table structure in the database. The virtual table is virtually built on the fly at query execution time, so no pre-processing is required and no additional procedures are needed to keep data in synch. In addition, because the virtual table maps to all columns and rows within the data model, there is no need for the querying user to know the underlying data structure.

A query on the virtual table is translated into a set of data model queries for searching the data model, based on columns selected from the virtual table, data type of searched constant and other specified search parameters, as well as the virtual table definition. The search process works in conjunction with data domains, which store only unique values, to prevent redundant searching of data duplicated across tables. In addition, compaction and tokenization of data speeds up the search process.

The method is performed using a set of computer-executable modules according to one embodiment. A virtual table module defines a virtual table that is not physically present in the data model. A query translation module receives a query indicating the virtual table, and translates the query into a set of data model queries, and passes the set of data model queries to a search process. An ID files module uses a metadata database to identify which compacted files may have archived data that will satisfy a received query. A search agent module accesses each identified stored compacted file to determine if there are any actually data stored in the compacted file that will satisfy the original query. A result module builds a search result based on the search results received from the search agents. A result processing module receives results of the set of data model queries and processes the results based on the selected one or more columns of the virtual table and any ordering rules to produce a result set.

BRIEF DESCRIPTION OF THE DRAWINGS

These and other features, aspects, and advantages of the present invention will become better understood with regard to the following description, appended claims, and accompanying drawings where:

FIG. 7 is a block diagram illustrating a compaction method according to one embodiment.

FIG. 8A is block diagram illustrating the use of Boolean operations on bit vectors to generate query results according to one embodiment.

FIG. 13 is a user interface showing results of the query of FIG. 13 according to one embodiment.

FIG. 14 illustrates three tables corresponding to a domain structure, T1, T2, and T3 according to one embodiment.

FIG. 15 illustrates a result set for a query specifying a parameter "value like %10%" across three domains according to one embodiment.

DETAILED DESCRIPTION

Figure 1:
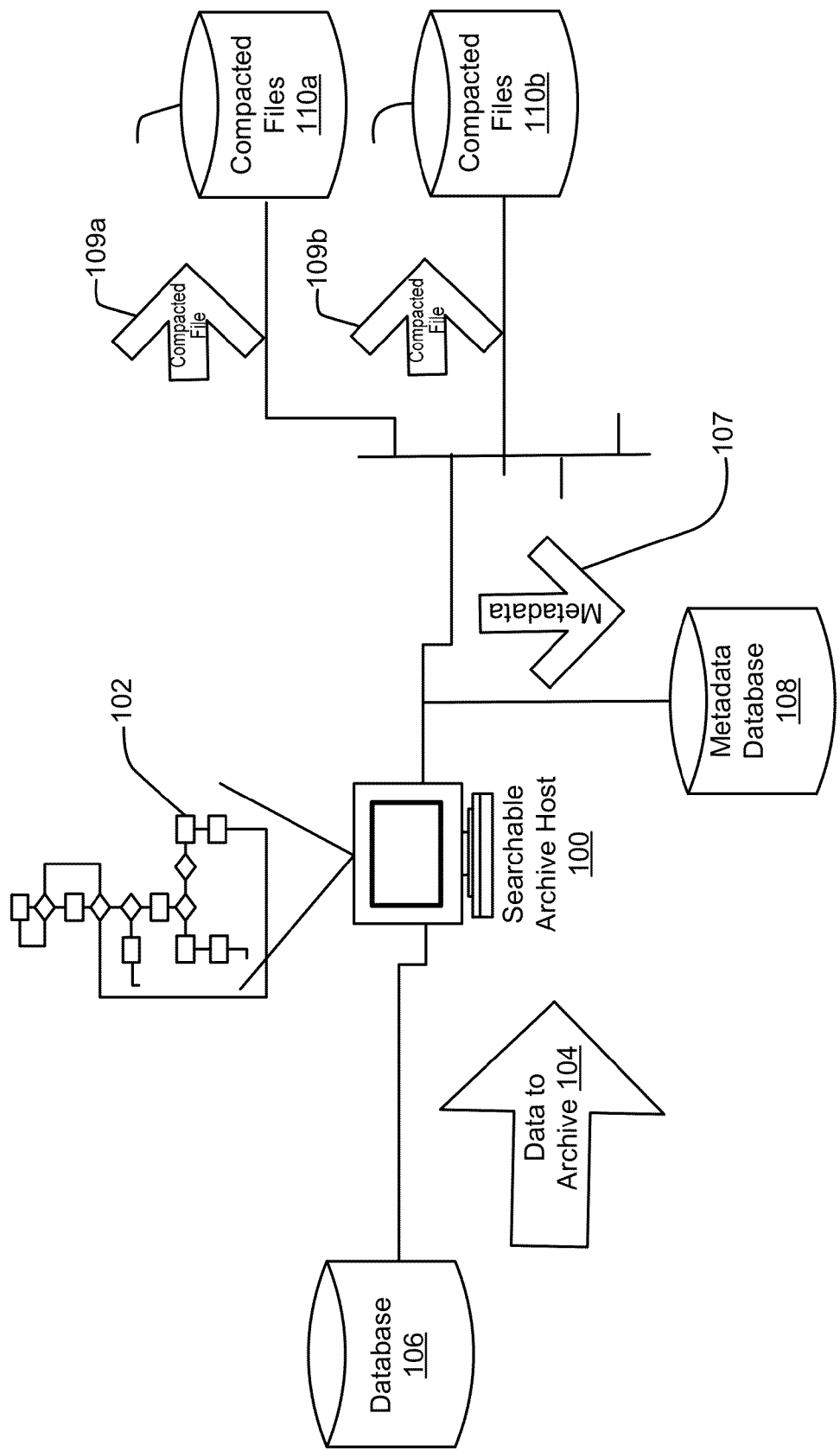
FIG. 1 is a block diagram of a searchable archive system in an archiving mode according to one embodiment.

FIG. 1 is a block diagram of a searchable archive system in an archiving mode in accordance with one embodiment of the present invention. A searchable archive system includes a searchable archive host 100. The searchable archive host hosts an archiving process 102. The archiving process receives or gets archive data 104 from a database 106, such as a tabular file in a format such as a Comma Separated Value (CSV) formatted text file, coupled to the searchable archive host. The archiving process extracts metadata 107 describing the archive data from the archive data and stores the metadata in a metadata database 108. The archiving process also generates one or more compacted files, such as compacted files 109a and 109b, that are stored in one or more compacted file data storage devices, such as compacted file storage devices 110a and 110b.

As illustrated in FIG. 1, the storage devices are coupled directly to the searchable archive host. In other embodiments, the storage devices are loosely coupled to the storage devices through a communications network. This enables the searchable archive to be distributed across as many storage devices as necessary to storage the compacted files. In addition, the loose coupling between the metadata and the compacted files allows the searchable archive to be added to in an incremental manner without requiring reconstituting the original archive data using the compacted files.

Figure 2A:
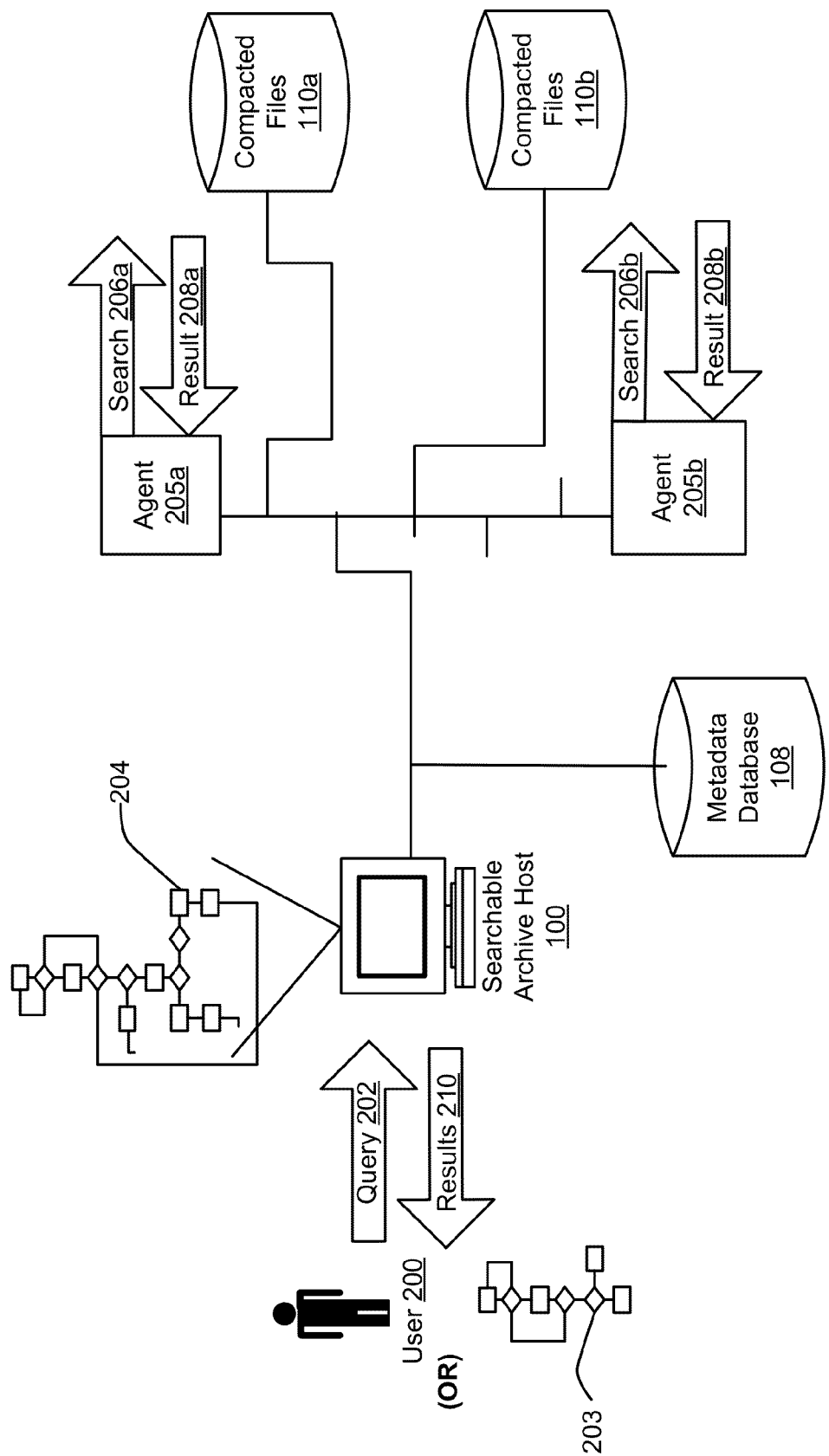
FIG. 2A is a block diagram of a searchable archive system in a data retrieval mode according to one embodiment.

FIG. 2A is a block diagram of a searchable archive system in a data retrieval mode in accordance with one embodiment of the present invention. Once an archive is created, a user 200 or an automated process may access the compacted files without reconstituting the entire original archive data structure. To do so, the user uses a search process 204 hosted by the searchable archive host. The user submits a query 202 to the search process. According to another embodiment, the query 202 is one or more data model queries received from a separate process 203, e.g., via the process 1200 as described in conjunction with FIG. 12. The search process uses a metadata database 108 to identify which compacted files may have archived data that will satisfy the query. The search process then accesses each identified stored compacted file to determine if there are any actually data stored in the compacted file that will satisfy the original query. The search process does so through the use of one or more search agents, such as search agents 205a and 205b, that independently access one or more compacted files stored in the compacted file storage devices, such as storage devices 110a and 110b.

Each search agent conducts an independent search, such as search 206a by search agent 205a and search 206b by search agent 205b, of one or more compacted files identified by the search process. Each search agent also independently reports search results, such as search results 208a and 208b, back to the search process. The search process uses the search results received from the search agents to build a search result 210 that is presented to the user.

Figure 2B:
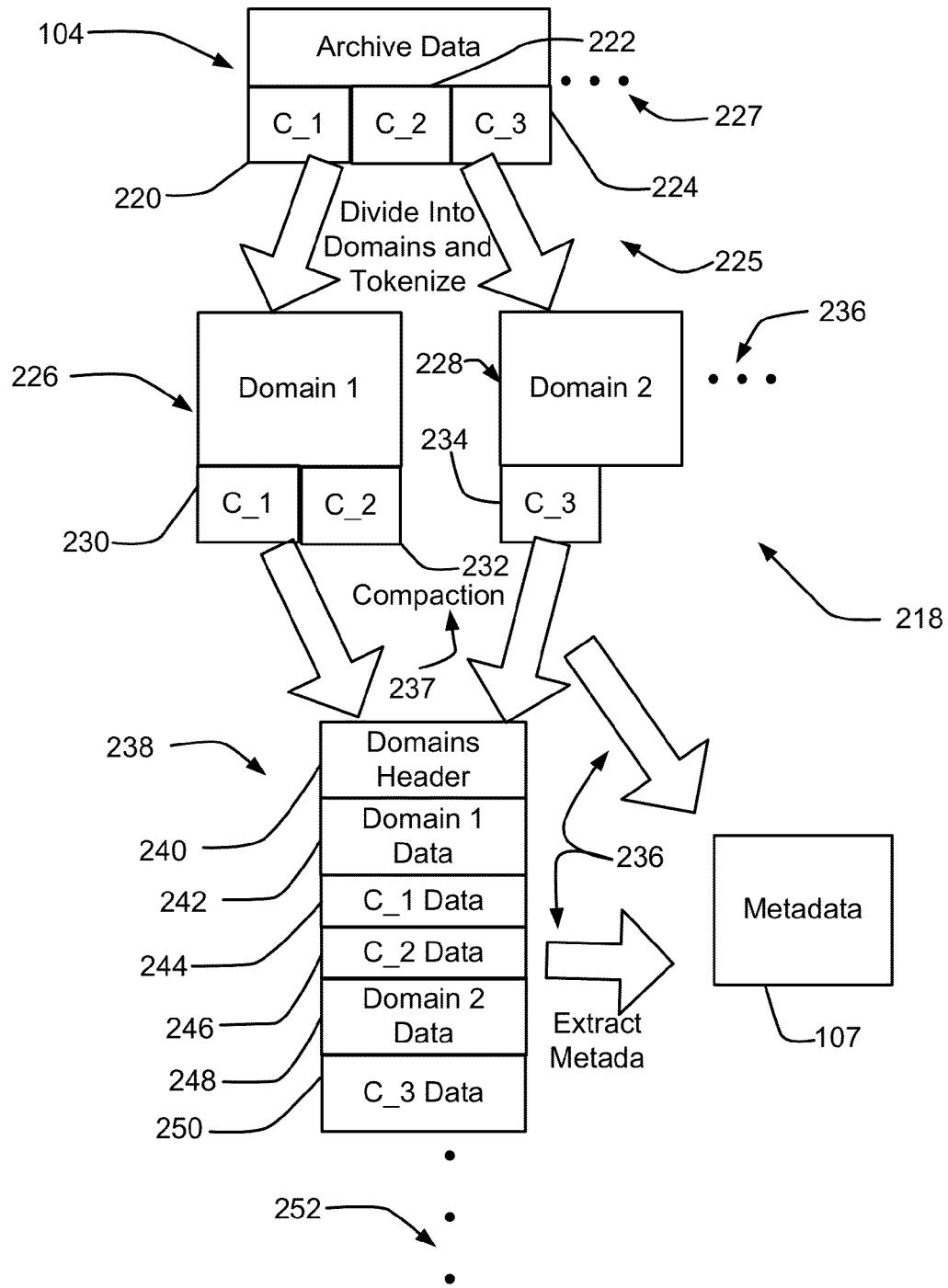
FIG. 2B is a flow diagram of a searchable archive generation process according to one embodiment.

FIG. 2B is a flow diagram of a searchable archive creation process in accordance with one embodiment of the present invention. A searchable archive creation process 218 receives archive data 104 including one or more columns of values, such as columns 220, 222, and 224. The number of columns in the archive data, and the number of values in the columns, is arbitrary as indicated by ellipses 227. The process associates (225) the columns of data in one or more domains, such as domains 226 and 228. Each domain may then be associated with one or more columns of data from the archive data.

After associating the columns to domains, each domain is processed separately to generate columns of tokens corresponding to the value columns in a tokenization process. For example, token column 230 is associated with domain 226 and corresponds to value column 220 in the archive data. In a similar manner, token column 232 is associated with domain 226 and corresponds to value column 222. In this example, two domains are shown. Domain 228 is associated with only a single token column 234 corresponding to value column 224 in the archive data. Ellipses 236 indicate that the number of domains and associated token columns is arbitrary as the number of columns in the archive is arbitrary.

Once the domains and token columns have been created, they are compressed in a compaction process 237 to create a compacted file 238. Within the compacted file, information about the domains included in the compacted file is stored in a domains header 240. In addition, domain data for each domain is stored in the compacted file. For example, domain data 242 corresponds to domain 226 created during the tokenization process and domain data 248 corresponds to domain 228. The domain data includes a domain structure associating unique values from the archive data to token values used to generate the token columns. The compacted file further includes compressed token column data, such as compressed token column data 244, 246, and 250 for each token column associated to a domain. For example: compressed token column data 244 corresponds to token column 230; compressed token column data 246 corresponds to token column 232; and compressed token column data 250 corresponds to token column 234. Ellipses 252 indicated that the size of the compacted file is arbitrary as it is dependent on the size of the original archive data set.

During the tokenization and compaction process, archive metadata and segment metadata 107 is extracted 236 for use as an index for accessing the compacted file. The metadata may exported in a variety of formats that may be useful an archive retrieval process.

Figure 3:
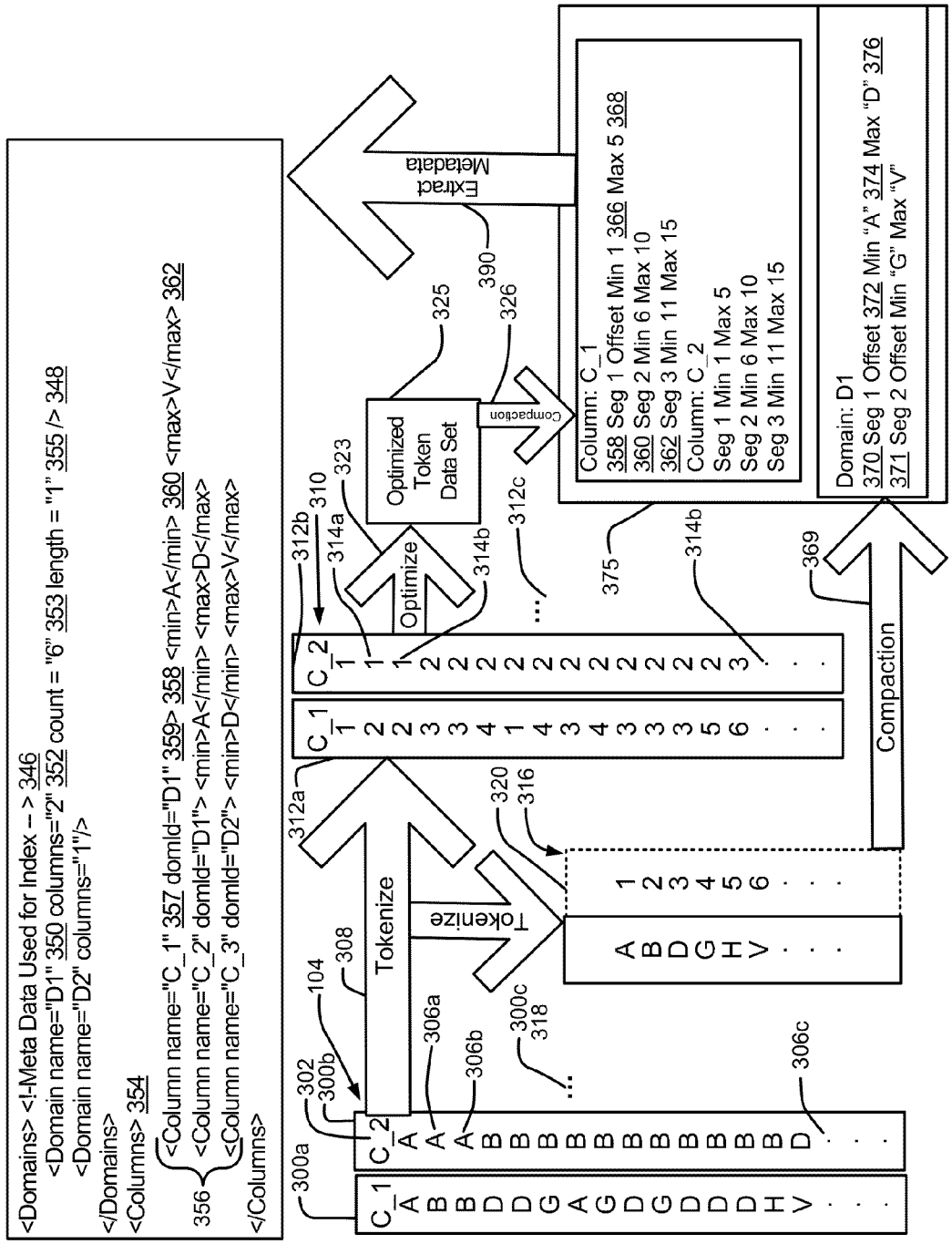
FIG. 3 is a block diagram of a searchable archive creation process according to one embodiment.

FIG. 3 is a block diagram of a compacted file creation process in accordance with one embodiment of the present invention. In a compacted file creation process, a portion of an archive data set 104 associated with a domain includes one or more value columns, such as value columns 300a and 300b, of tabulated values. Ellipses 300c indicate that the number of value columns in the archive data set is arbitrary. Each value column may be characterized by a value column header 302 and one or more rows of tabulated values, such as rows 306a and 306b. Ellipses 306c indicate that the number of rows in the value columns are arbitrary.

During the archive creation process, the archive data set is tokenized 308. During tokenization, the values in a value column are replaced with tokens to create a token column. If the length of the token is less than the length of the unique value, then the overall size of the column of data will be reduced, thus compressing the archive data set. For example, in the block diagram, a tokenized data set 310 is generated from the archive data set 104 during tokenization. The tokenized data set retains the column formation of the archive data set. In the example, token column 312a corresponds to archive value column 300a and token column 312b corresponds to archive value column 300b. Ellipses 312c indicate that the number of token columns correspond to the number of value columns in the original archive data. In each token column, a token exists for each value in the original corresponding archive data value column. For example, token 314a corresponds to value 306a and token 314b corresponds to value 306b. Ellipses 314c indicate that the number of tokens in a token column correspond to the number of values in the archive data's corresponding column.

In addition to a tokenized data set, tokenization creates a domain structure 316 associating the token values and the unique values. The domain structure includes the sorted unique values 318 extracted from the archive data. Their position inside the list is their associated token value. In addition, as the unique values are stored in sorted form, their position in the table also indicates a lexical id for their corresponding token values. This feature of a domain structure is illustrated by lexical id column 320 shown in phantom.

Once the tokenized data set has been created, opportunities exist to optimize 323 the size of the tokenized data set. For example, before the domain structure is complete, it is difficult to determine the optimal size of the tokens because the number of tokens needed to represent the unique values in the archive data is unknown. However, after the domain structure 316 is complete, the total number of tokens, and therefore the optimal size for the tokens, can be easily calculated. Once the optimal token size is determined, the tokens in the tokenized data set may be replaced with a new set of optimally sized tokens thus creating an optimized token data set 325.

The optimized domain structure is compacted 369 by dividing the domain structure into one or more compressed domain structure segments, such as compressed domain structure segments 370 and 371, in compacted file 375. The number and size of the domain structure segments depends on the number of unique values in the domain structure. During compaction, the domain structure is examined to determine how to divide the domain structure into individual compressed domain structure segments. The determination is based on the desired size of the compressed domain structure segments and the number of unique values in the domain structure. For example, if a domain structure has very few unique token values, it may compress to a small size and may fit within one compressed domain structure segment. In contrast, if a domain structure contains many unique values, more than one compressed domain structure segment is used to hold the compacted domain structure.

For each domain structure segment, the minimum and maximum values are kept for the domain structure segment. As no value exists in more than one domain structure segment, the minimum and maximum values constitute a coarse index that is used to determine which domain structure segments should be used when searching for a particular unique value. The segments are then individually compressed using a prediction by partial matching (PPM) algorithm. This type of algorithm uses the last few characters of a value to predict the next character and is well suited for compression of the domain structure because the unique values are already sorted.

In the illustrated compacted file 375, the compacted file includes domain D1 having a domain structure divided into two compressed domain structure segments 370 and 371. An offset 372 indicates the position in the compacted file of a compressed domain structure segment. In addition, a minimum value 374 and a maximum value 376 indicate the range of unique values included in the compressed domain structure segment.

After tokenization and optimization, the optimized tokenized data set is compacted (326) and stored in the compacted file 375 as well. For each token column in the tokenized data set one or more compressed token column segments are created. The number and size of the compressed token column segments depends of the numbers of tuples (records) of the archive data set. For each compressed token column segment, starting and ending tupleid are recorded. As there is a low degree of correlation between the tokens stored in the token columns, a statistic algorithm based on arithmetic coding is used for the creation of the compressed token column segments.

As an example, in the illustrated compacted file 375, the compacted file includes compressed token column segments 358, 360, and 362 corresponding to token column 312a which corresponds to value column 300a. For each compressed token column segment, a minimum tupleid 366 and a maximum tupleid 368 are indicated. Compressed token column segments are located in the compacted file for each token column associated with the domain.

Once completed, the compacted file 375 includes compressed domain structure and token column data. During the tokenization and compaction process, domain metadata, token column metadata, and segment metadata is extracted (390) from the domain structure and the token columns. Portions of the extracted metadata is included in the compacted file as a header accessible without decompressing any of the segments in the compacted file. Portions of the archive metadata are also included in a metadata file 332. The metadata file may be used by a data processing system to access data stored in the compacted files.

An exemplary metadata file 332 is illustrated in an eXtensible Markup Language (XML) format; however, any format may suffice. In the metadata file, metadata is included to show metadata extracted from a first and second domain; however, the number of domains is arbitrary. Within an XML format metadata file, a "Domains" tag 346 includes one or more domain tags 348. Each domain tag includes a "Domain name" attribute 350 and a "columns" attribute 352. The columns attribute indicates the number of token columns in a domain. A "count" attribute 353 indicates the number of total unique values stored in the domain structure. A "length" attribute 355 indicates the length of the unique value storage locations within the domain structure.

A "Columns" tag 354 includes one or more column tags 356. Each column tag includes a "Column name" attribute 357 indicating the name of a value column from the archive data included in the compacted file. The column tag further includes a "domId" attribute 359 indicating the domain to which the column belongs. A "min" attribute 361 indicates the minimum unique value found in the column. A "max" attribute 363 indicates the maximum unique value found in the column.

Referring again to FIG. 1 once the compaction process is completed, a compacted file 375 (of FIG. 3) is stored in a file system having one or more compacted file data stores, such as compacted file data store 110a and 110b. Metadata file 332 (of FIG. 3) is used to populate a metadata database 108. As the compacted files are stored in a file system, new archive data may be added to the archive system to the capacity of the file system. In addition, metadata may be added to the metadata database to the extent of the capacity of the metadata database.

Figure 4:
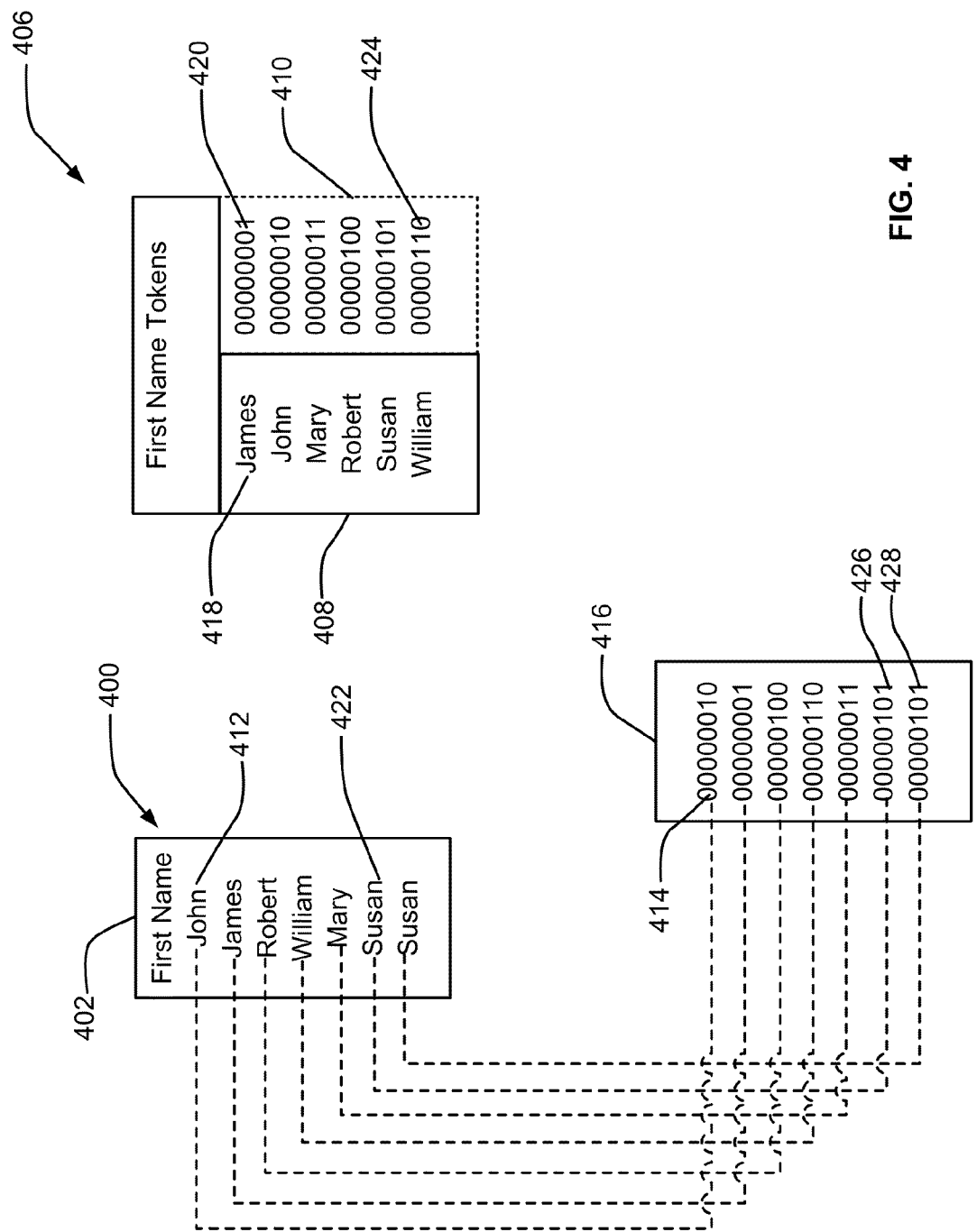
FIG. 4 is a block diagram of a tokenization process according to one embodiment.

FIG. 4 is a block diagram of a tokenization process in accordance with one embodiment of the present invention. In the illustrated tokenization process, an archive data set 400 includes a "First Name" column 402. In this illustration, each unique First Name column entry is replaced by an eight bit token. For the First Name column, a "First Name Tokens" domain structure 406 is created. The domain structure has a name column 408 for storage of unique first names encountered in the archive data set. The domain structure includes a token column 410 for storage of tokens assigned to the unique values.

In this example, the name "John" 412 is the first unique value in the column and is replaced by the token "00000010" 414 in the tokenized data set 416. An entry is made into the domain structure for the unique value "John" 418 and the assigned token value "00000010" 420. For each subsequent unique value in the column, a new token value is generated, associated with the unique value in the domain structure, and used to replace the unique value in the tokenized data set.

In the case where the unique value is encountered in the archive data again, a new token value is not generated.

Instead, the token value is read from the domain structure and inserted into the tokenized data set. In the illustrated example, the unique value "Susan" 422 appears in the archive data more than once. The value Susan is associated in the domain structure with the token "00000101" 424. This token is then inserted into the tokenized data set two times, at location 426 and 428, to represent the two instances of Susan in the original archive data.

Figure 5:
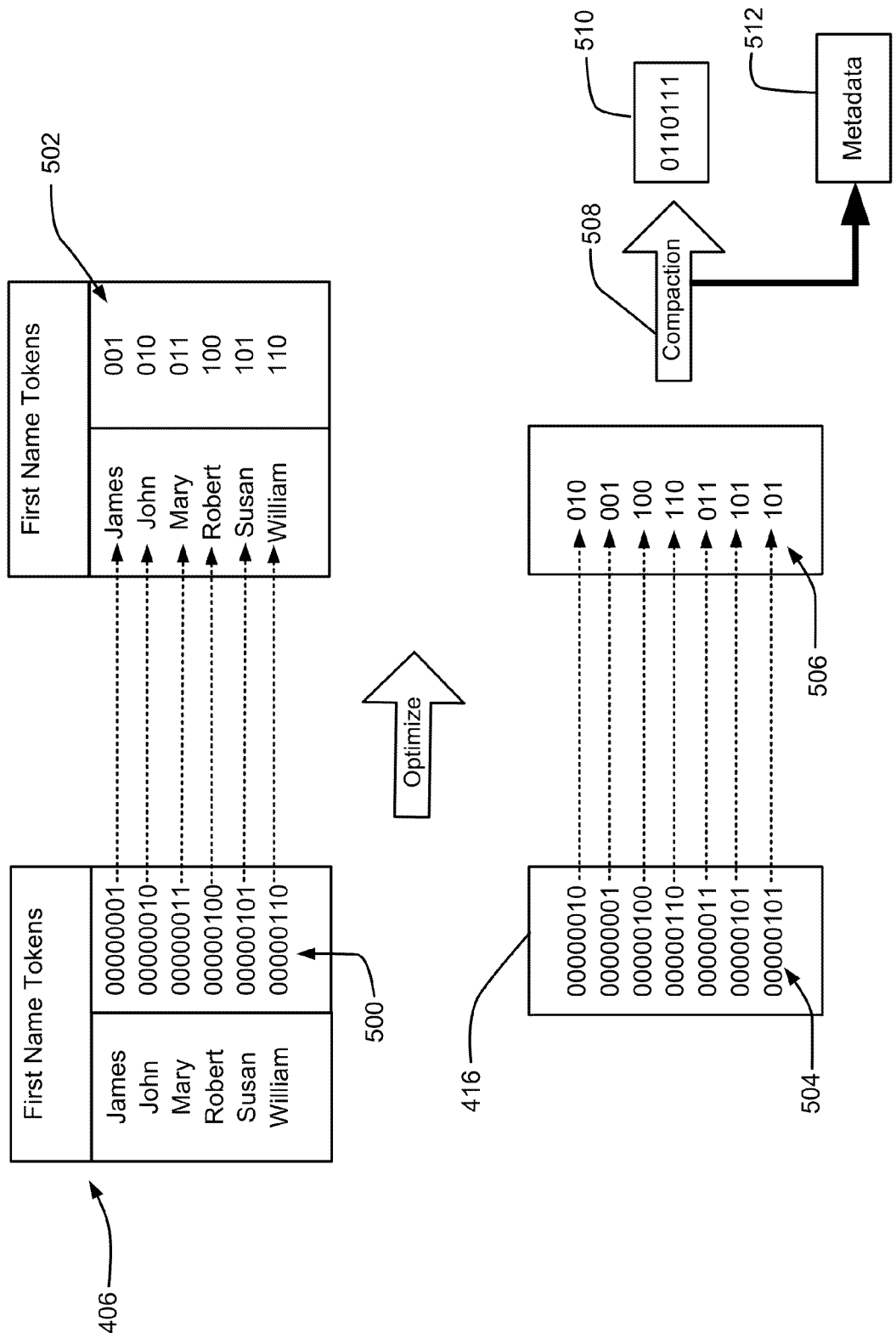
FIG. 5 is a block diagram of a token optimization process and tokenized data set compaction process according to one embodiment.

FIG. 5 is a block diagram of a token optimization process and tokenized data set compaction process in accordance with one embodiment of the present invention. Once a tokenized data set is created from the archive data, the number of tokens needed to represent all of the unique values in the archive data is known. Therefore, an optimal size can be determined for the size of the tokens used. In the example of FIG. 4, an eight bit token is used. An eight bit token can represent up to 256 unique values. However, at the end of the tokenization process, it can be seen that the number of unique values in the example was only six. Therefore, a three bit token is all that is required to give each unique value a unique token value. Referring again to FIG. 5, domain structure 406 is optimized by replacing eight bit tokens 500 in the token column with three bit tokens. This generates an optimized domain structure having three bit tokens 502. In a similar manner, tokenized data set 416 from the example in FIG. 4 is optimized by replacing eight bit tokens 504 with three bit tokens 506.

Once the tokenized data set has been optimized, it may be compacted 508 to generate a compacted file 510. During the compaction process, previously described metadata 512 is extracted from the tokenized data set.

Figure 6:
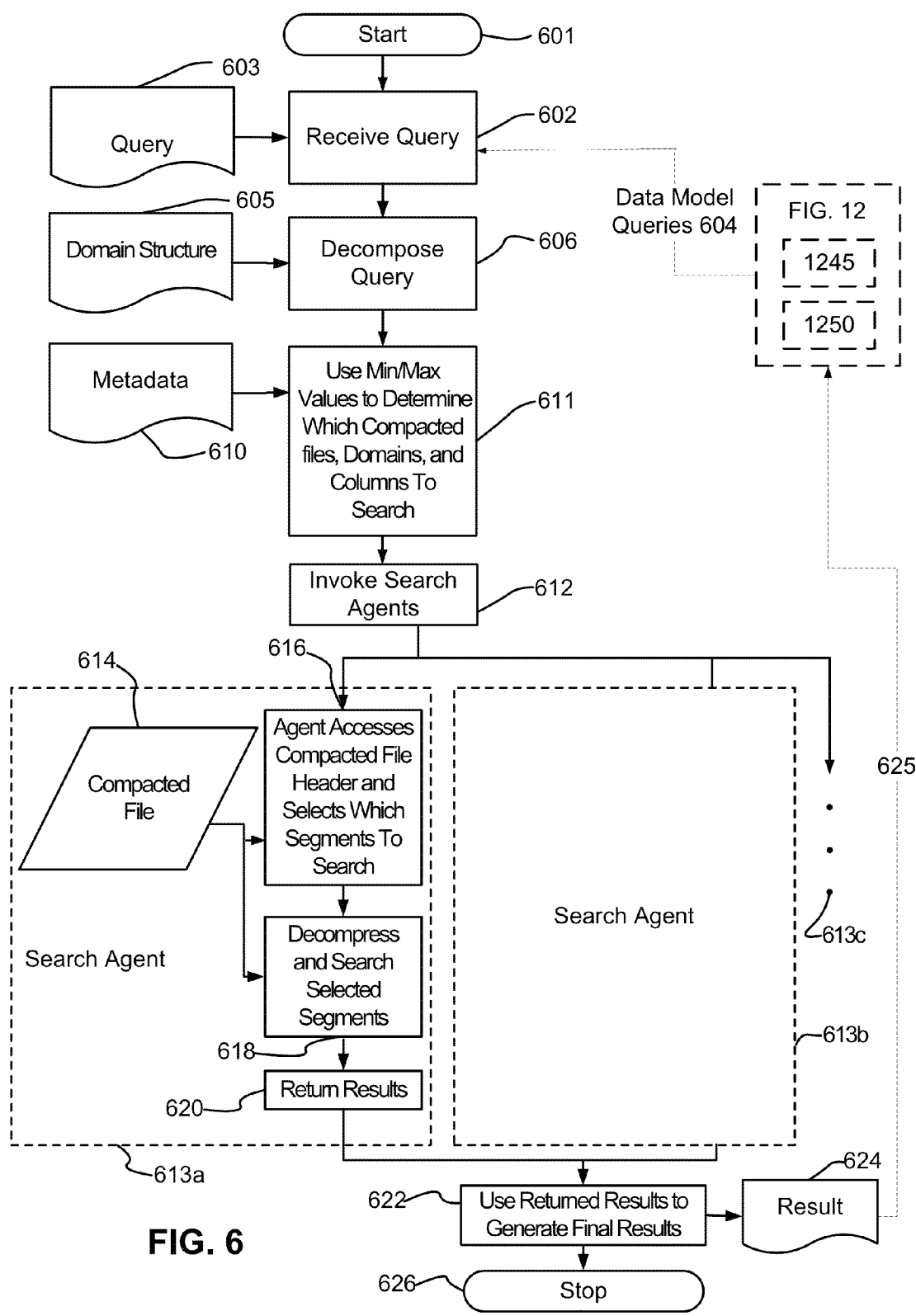
FIG. 6 is a process flow diagram of a search process employing search agents according to one embodiment.

FIG. 6 is a process flow diagram of a search process employing search agents in accordance with one embodiment of the present invention. As previously described, search agents, such as search agents 205*a* and 205*b* (of FIG. 2), are used within the archive system to access the compacted files and retrieve archive data. The search agents are invoked by a search process 204 (of FIG. 2). At the start 601 of a search process, the search process receives 602 a query 603 from a user or an automated process. The search process uses a domain structure 605 to decompose 606 the query into an equivalent tokenized query. According to one embodiment, the query received 602 is from a set of data model queries 604 produced by the process described in conjunction with FIG. 12, transmitted to the search process in step 1245.

The search process accesses metadata 107 to determine 611 which compacted files, domains, and columns need to be searched to find archived data that may satisfy the query. The search process does so by using the minimum and maximum token values extracted from the columns in a compacted file before the columns were segmented and compressed. These minimum and maximum values are compared to the token values in the tokenized query to make the determination. Once the determination is complete and compacted files have been selected, the search process invokes 612 one or more search agents, such as search agents 613*a* and 613*b*, that will independently access the identified compacted files. Ellipses 613*c* indicate that an arbitrary number of independently functioning search agents may be invoked by the search process. This allows the search process to search a plurality of compacted files independently. In addition, as search agents are used to access the compacted files, the compacted files may be maintained in any convenient manner and loosely coupled to the search process.

The following search agent process is described for a single search agent; however, each invoked search agent will perform similar search processes in parallel. Once invoked, each search agent accesses 616 a compacted file 614 and searches the compacted for archived data that may satisfy the query. To do so, the search agent reads the compacted file's header to determine which domain structure segments may contain data that may satisfy the query. As the compacted file's header includes the minimum and maximum token values stored in each compressed domain structure segment, the search agent may determine which segments may include data that will satisfy the query. Once a compressed segment has been identified as possibly containing the desired data, the search agent decompresses 618 the selected compressed segment and searches the decompressed segment for the requested data and identifies the token associated with the values involved into the request criteria. The process is repeated for each compressed segment identified by the search agent as potentially containing the desired archive data. After that process, token representation of the request criteria is used to analyze each tokenized dataset segment involved. The search agent returns 620 any result data found during the search to the search process. The search process collects all of the returned results to generate a final search result 624 and stops 626 searching. According to one embodiment, the result 624 is transmitted 625 back to the process described in conjunction with FIG. 12, where it is received at step 1250.

FIG. 7 is a block diagram illustrating a bit vector based compaction method in accordance with one embodiment of the present invention. In this compaction method, the compacted file may be searched in its entirety without decompressing any of the data stored in the compacted file. Archive data 700 having multiple columns of data is tokenized and optimized as previously described. In this example, the archive data is a listing of first and last names of a group of individuals with the first names in a first archive value column 702 and the last names in a last name archive value column 704. The result of the tokenization and optimization process is a tokenized and optimized data set 706. The tokenized data set includes a first name token column 708 corresponding to the first name archive value column and a last name token column 710 corresponding to the last name archive value column. The tokenized data set may be compressed through the generation of a set of bit vectors 712.

Each bit vector in the set of bit vectors corresponds to a token. The length of each bit vector is equal to the number of token values in a token column. The values in the bit vector reflect the presence or absence of the corresponding token at a particular position in the token column. For example, bit vector 718 corresponds to the token "011" in the first name token column. Token "011" appears at the fifth position in the first name token column; therefore, a "1" appears in the fifth position in bit vector 718. As token "011" corresponds to the name "Mary" in the first name column of the archive data, this means that the name "Mary" is the fifth entry in the first name value column of the archive data set. In a similar manner, bit vector 724 corresponds to the last name "Adams" in the last name value column of the archive data set. Upon completion of the vectorization process, the compacted file consists of subsets of bit vectors with each subset corresponding to a token column in the tokenized data set and thus a column in the archive data set. In this example, bit vector subset 714 corresponds to the first name value column 702 in the archive data and bit vector subset 716 corresponds to the last name value column 704 in the archive data.

One feature of the tokenization process is that it creates a lexical ordering of the values in a column of an archive data set. As such, the bit vectors need not be stored with header information identifying which bit vector is associated with which token. Instead, the bit vectors are stored in a compact fashion in the lexical order of the tokens.

FIG. 8A is block diagram illustrating the use of Boolean operations on bit vectors to generate query results in accordance with one embodiment of the present invention. The bit vectors of FIG. 7 may be used directly in Boolean operations to satisfy queries. As an example, a query for the name "Mary Adams" may be decomposed into a query expression 800 of "First Name=Mary" AND "Last Name=Adams." This expression may be evaluated for the entire compacted file 712 (of FIG. 7) by selecting bit vector 716 corresponding to the first name "Mary" and bit vector 724 corresponding to the last name "Adams". These bit vectors may be combined in a Boolean AND operation 802 to yield a result bit vector 804. This bit vector has a "1" 806 in the fifth position indicating that the name "Mary Adams" is found in the compacted file.

Figure 8B:
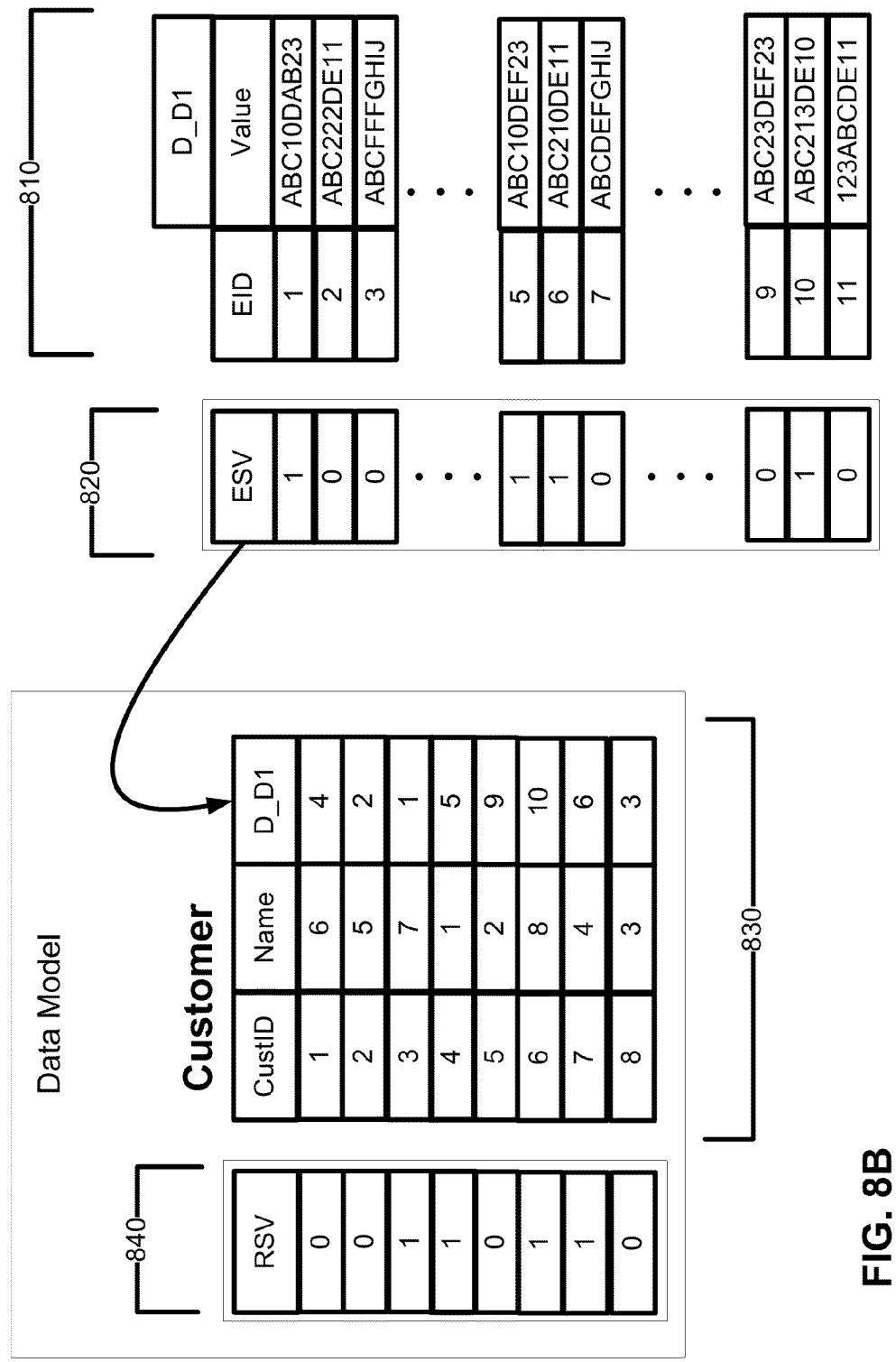
FIG. 8B is a block diagram showing an illustration of a bit vector based compaction method used in conjunction with selection criteria for a query according to one embodiment.

FIG. 8B is a block diagram showing a different illustration of a bit vector based compaction method according to one embodiment, as used in conjunction with selection criteria for a query. As in FIG. 7, this method allows the compacted file to be searched in its entirety without decompressing any of the data stored in the compacted file. Domain 810 shows Domain 1 (D1 as later described in conjunction with FIGS. 15 and 16). An abbreviated list of domain values are shown, with their corresponding entity IDs (EIDs).

Selection criteria corresponding to a query are applied to the domain to provide an entity selection vector (ESV) 820. In this example the SQL query is:

SELECT *
FROM DATA_DISCOVERY.FAS_DD
WHERE VALUE LIKE '%10%'

Thus, a criterion is that the value include "10" (wild cards on each side). The ESV 820 is a bit vector, with each bit value representing the presence or absence of a value in each row corresponding to the selection criteria. For example, since the rows corresponding to EIDs 1, 5, 6, and 10 of domain 810 are the rows that include a value corresponding to "like %10%," those rows have a 1 in the ESV, whereas the other rows have a 0.

Next, the ESV 820 is promulgated to the underlying customer table 830 to create the row selection vector (RSV) 840, which will be used to select rows to return as results based on the query parameters. Again, EIDs 1, 5, 6, and 10 correspond to ESV 820 values of 1, thus the corresponding rows in RSV 840 for these EIDs in the D_D1 column are shown as 1, i.e., the third, fourth, sixth, and seventh entries in RSV 840. The remaining rows are shown as 0, and thus will not be selected. Referring also to FIG. 16, a result set for a query specifying a parameter "value like %10%" across three domains is shown, with the top four rows corresponding to the rows selected via RSV 840 in FIG. 8B.

Figure 9:
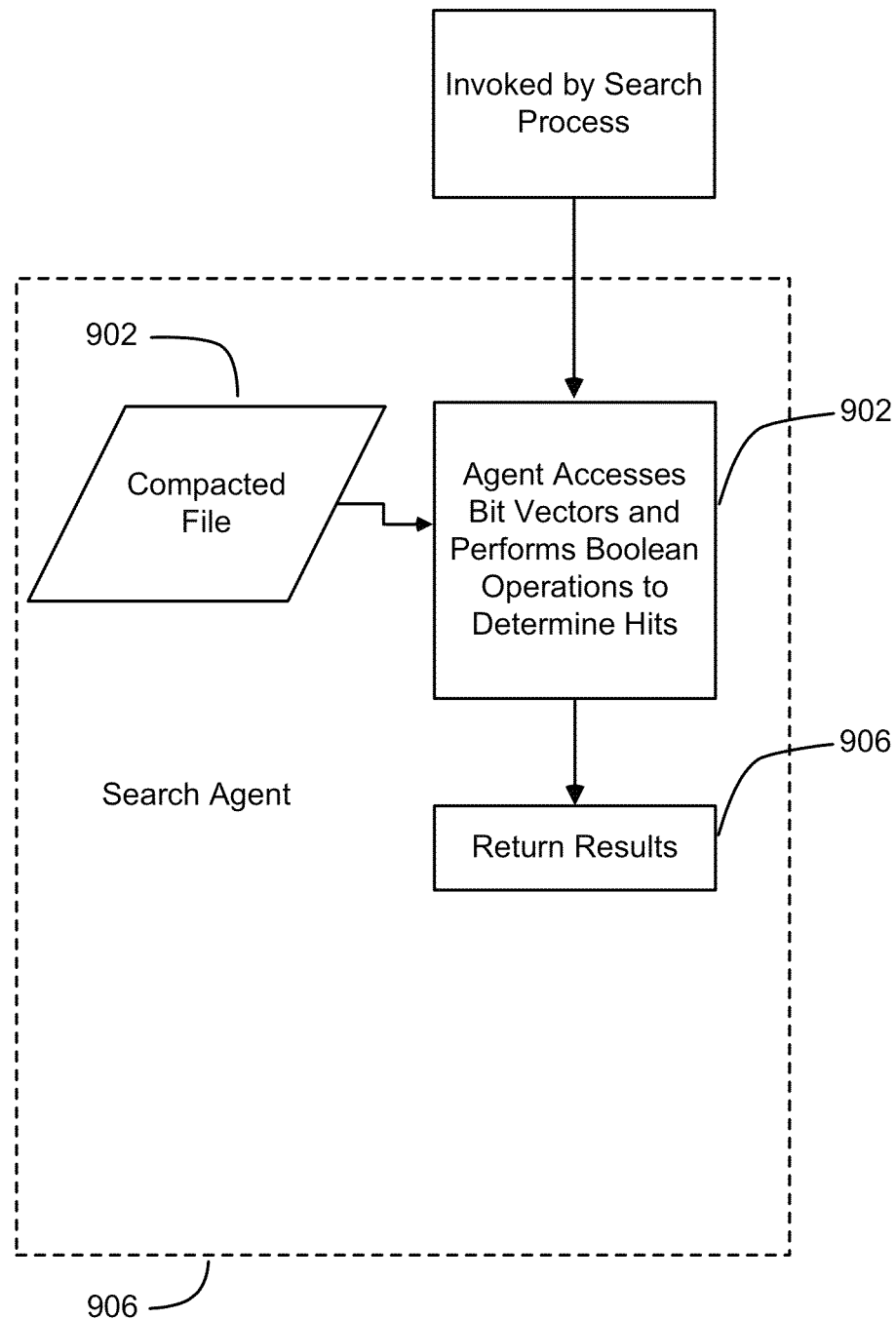
FIG. 9 is a process flow diagram of a search agent process for an archive system using compacted files having bit vectors according to one embodiment.

FIG. 9 is a process flow diagram of a search agent process for an archive system using compacted files having bit vectors in accordance with one embodiment of the present invention. The operation of a search process 204 (of FIG. 2) is similar whether or not a compacted file uses bit vectors or compressed segments. However, the operations of a search agent, such as search agent 205a (of FIG. 2), are different depending on whether or not the compacted file accessed by the search agent includes bit vectors or compressed segments. A search agent 900 used with compacted files having bit vectors is invoked 901 by a search process. The search agent accesses a compacted file 902 selected by the search process. The search agent then selects (904) one or more bit vectors corresponding to a datum that the search agent is searching for. The search agent then performs a Boolean operation on the selected bit vectors to determine if the data in the compacted file satisfies a query received from the search process 204 (of FIG. 2). At the completion of the Boolean operation, a bit vector is created to act as a selector which is used to identify which tuples should be returned. Based on the projection list, list of columns or attributes to be returned in the request, and the bit vector record selector, the search agent materializes the result data. The materialization of the result data is executed doing an inversion process where the token ID of the desired tuples are replaced with the value using a lookup function is used to implement it. At the completion of that materialization process, the search agent returns 906 any results to the invoking search process. Bit vector processing in general is discussed in greater detail in U.S. Pat. No. 5,036,457 issued to Glaser et al. the contents of which are hereby incorporated by reference as if stated in full herein.

Figure 10:
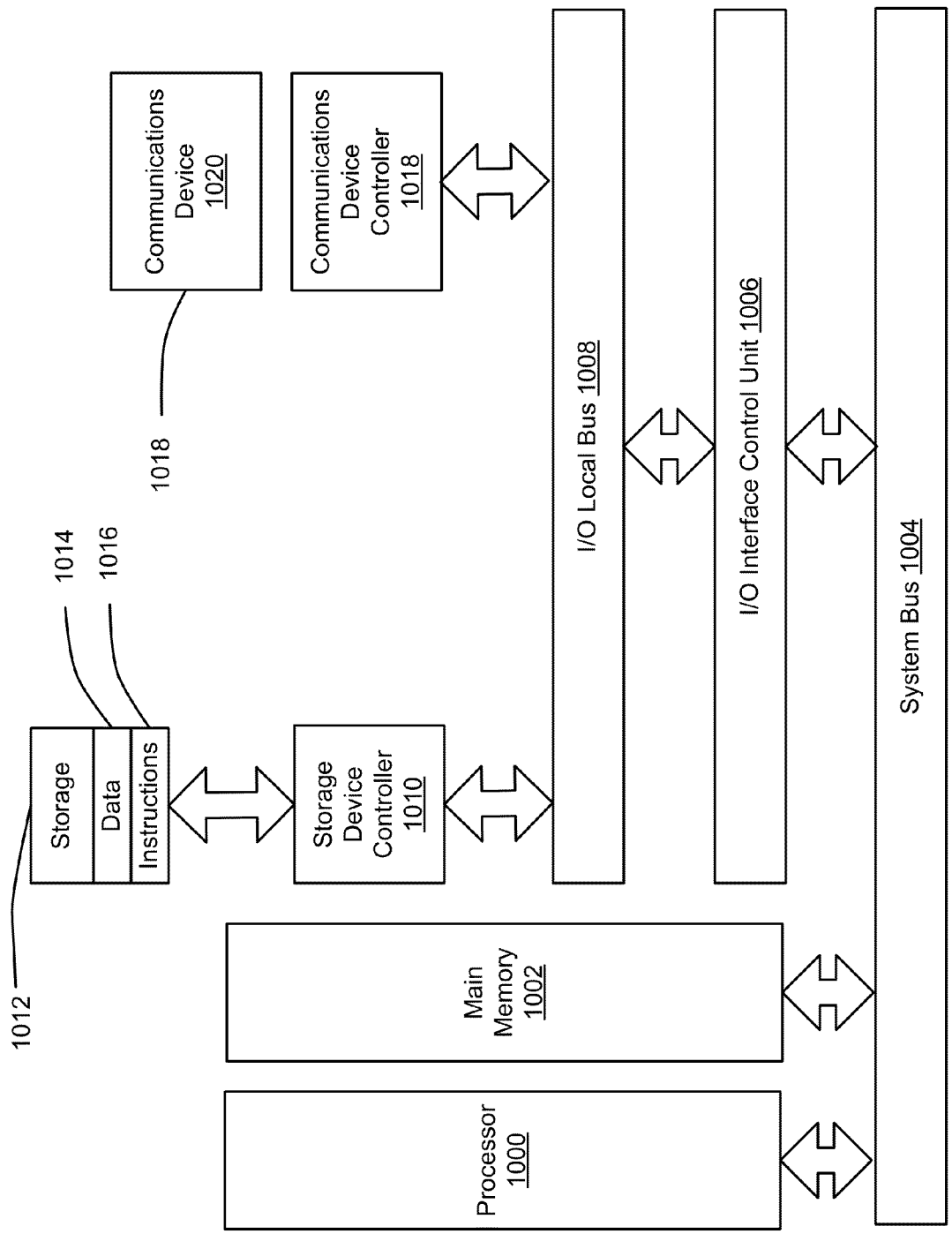
FIG. 10 is an architecture diagram of a data processing system according to one embodiment.

FIG. 10 is an architecture diagram of a data processing apparatus used as an archive system host in accordance with one embodiment of the present invention. The data processing apparatus includes a processor 1000 operably coupled to a main memory 1002 by a system bus 1004. The processor is further coupled to a storage device 1012 through an Input/Output (I/O) control unit 1006, an I/O local bus 1008, and a storage device controller 1010. The storage device may be used to store programming instructions 1016.

In operation, the processor loads the programming instructions (which may take the form of software modules as described in conjunction with FIG. 11 below) from the storage device into the main memory. The programming instructions are then executable by the processor to implement the features of an archiving system as described herein. The storage device may also be used to store data 1014 used by the processor to implement the features of the archive system.

The processor may be further coupled to a communications device 1018 via the Input/Output (I/O) control unit, the I/O local bus 1008, and a communications device controller 1018. The processor may then communicate with other data processing systems or file system for retrieval of compacted files.

Figure 11:
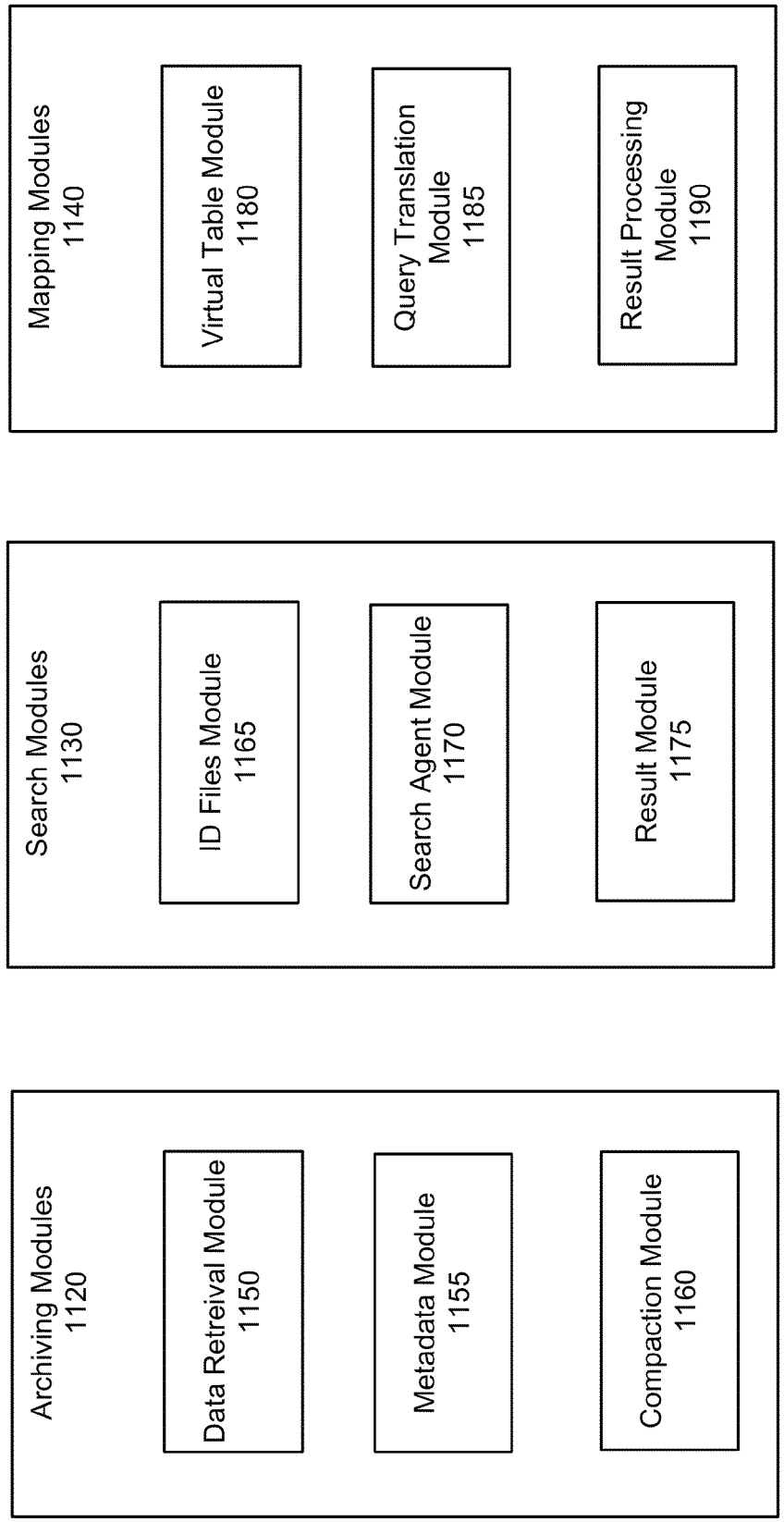
FIG. 11 is a block diagram showing programming instructions in the form of software modules for orchestrating the processes described herein according to one embodiment.

FIG. 11 is a block diagram showing software modules for orchestrating the processes described herein according to one embodiment. The modules in this embodiment include archiving modules 1120, search modules 1130, and mapping modules 1140.

The archiving modules 1120 provide functionality for the archiving process 102 as discussed in conjunction with FIGS. 1 and 2B. The archiving modules 1120 include a data retrieval module 1150, a domain and metadata module 1155, and a compaction module 1160.

The data retrieval module 1150 retrieves archive data as described herein, e.g., from database 106, and is one means for performing this function. The domain and metadata module 1155 extracts metadata from the archive data as described herein and stores the metadata, e.g., in metadata database 108, and is one means for performing this function. The domain and metadata module 1155 also associates columns of data into one or more domains, and processes each separately to generate columns of tokens corresponding to the value columns in a tokenization process, e.g., as described in conjunction with FIGS. 7, 8A, and 8B.

The compaction module 1160 generates compacted files as described herein, which are stored in one or more compacted file data storage devices, e.g., devices 110a and 110b, and is one means for performing this function. The domains and token columns created by the domain and metadata module 1155 are compressed to create the compacted file(s).

The search modules 1130 provide functionality for the search process 204 as discussed in conjunction with FIG. 2A. The search modules 1130 include an ID files module 1165, a search agent module 1170, and a result module 1175.

The ID files module 1165 uses a metadata database to identify which compacted files may have archived data that will satisfy a received query as described herein, e.g., a query received at step 602 of FIG. 6, and is one means for performing this function.

The search agent module 1170 accesses each identified stored compacted file to determine if there are any actually data stored in the compacted file that will satisfy the original query as described herein, and is one means for performing this function. The search agent module 1170 uses one or more search agents, which independently access one or more compacted files stored in the compacted file storage devices, and independently reports search results back to the search process.

The result module 1175 builds a search result based on the search results received from the search agents as described herein, and is one means for performing this function. The result module 1175 then presents the results back to the querying user or process.

Figure 12:
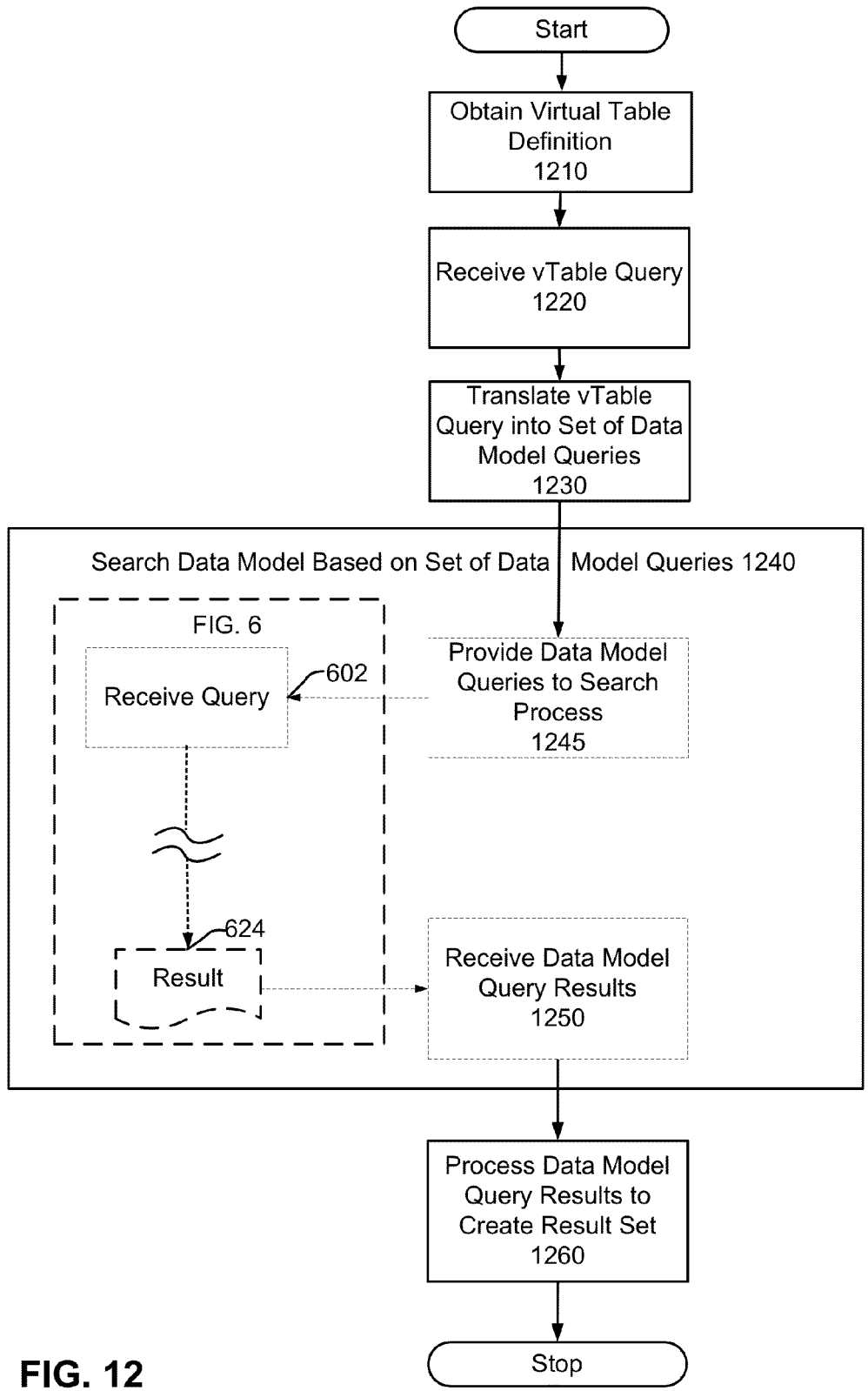
FIG. 12 is a flowchart describing a method of searching a data model using a virtual table according to one embodiment.

The mapping modules 1140 provide functionality for the virtual table-based searching process 1200 as discussed in conjunction with FIG. 12. The mapping modules 1140 include a virtual table module 1180, a query translation module 1185, and a result processing module 1190.

The virtual table module 1180 defines a virtual table that maps to data but is not physically present in the data model as described herein, and is one means for performing this function. Explicit creation of the virtual table is not required. A module called <Data_Discovery_Module> is called with the search query as a parameter, e.g., using SQL as described in conjunction with step 1210 of FIG. 12.

The query translation module 1185 receives a query indicating the virtual table, and translates the query into a set of data model queries as described herein, and is one means for performing this function. The query translation module 1185 also may pass the set of data model queries to the search process 204 of FIG. 6, according to one embodiment.

The result processing module 1190 receives results of the set of data model queries, e.g., from the search process 204 of FIG. 6, and processes the results based on the selected one or more columns of the virtual table and any ordering rules to produce a result set as described herein, and is one means for performing this function.

One skilled in the art will recognize that the system architecture illustrated herein is merely exemplary, and that the invention may be practiced and implemented using many other architectures and environments. In addition, the processes performed by the system architecture require an implementation on a computer, and cannot be performed in the human mind by mental steps alone.

FIG. 12 is a flowchart describing a method of searching a data model using a virtual table according to one embodiment. The method allows a keyword search to be performed on the tables and columns of an underlying data model, e.g., the archive data set 104 as described herein.

The method begins by obtaining 1210 a definition of a virtual table. In one embodiment, the virtual table module 1180 performs this step. As known in the art, a virtual table is "virtual" in the sense that it is not physically present in the data model. Rather, it is an interface to existing storage that appears to be, and functions as if it is, a table, but it does not store any data. The virtual table thus can be thought of as a "view" into the underlying data model.

The virtual table concept is use to create an abstraction layer on the data model to enable search requests to be executed without knowledge of the data model. A simple table eliminates the need for the user to understand the underlying data model. The virtual table acts as a template for a search request built over the data model, which allows for construction of the data model queries and enables definition of the lookup scope, if required, so the user query can be received as a single conventional full text query, but then mapped to the underlying queries. This process enables the creation of selection criteria using a universal object, which can be analyzed and transformed into specific underlying queries. The virtual table enables a user to exclude/include portion of the data model via selection of virtual table columns. The use of the virtual table format also provides a uniform result set over distinct data models and formats.

In the examples described herein, the virtual table has the following virtual columns, based upon the information that will be included in the columns of the result data set following step 1260 below:

SCHEMA (a schema name where the result is found);
TABLE (a table name where the result is found);
COLUMN (a column name where the result is found);
UROWID (the UROWID of the row containing the result); and
VALUE (the content of the column where the result is found).

The virtual table definition specifies a name, typically in the form SCHEMA_NAME.TABLE_NAME. The virtual table used in the examples herein is DATA_DISCOVERY.FAS_DD. A query to the name of the virtual table initiates the search process described below. This example shows a single FAS (File Archive Service) instance. However, the same FAS instance could support any number of databases and this process allows searching across the databases using this technique. To simplify the data type mapping explanation, the following exemplary virtual table creation is described. However, explicit creation of the virtual table is not required. A module called <Data_Discovery_Module> is called with the search query as a parameter, e.g., using the SQL form presented below.

```
CREATE VIRTUAL TABLE Data_Discovery.Fas_dd (
  SchemaName    VarChar(128),
  Tablename     VarChar(128),
  ColumnName    VarChar(128),
  uRowid        Dec(20),
  Value         VarChar(1024));
INSERT Into Data_Discovery.Fas_dd (
  SELECT * FROM <Data_Discovery_Module>
    WHERE SearchParm = <SELECT . . . FROM Data_Discovery.Fas_dd
      WHERE . . . >
```

In the next step, a query is received 1220 by query translation module 1185, indicating the virtual table. According to one embodiment, the query is in the form of a Structured Query Language (SQL) query, and specifies a SELECT clause, FROM clause, and a WHERE clause. The SELECT clause may specify one or more of the virtual columns above: SCHEMA, TABLE, COLUMN, UROWID, and/or VALUE, or "*" to select all columns. The FROM clause is used to designate the virtual table by its predefined name. The virtual table is not physically present in the database, but its name triggers the virtual table mode.

The WHERE clause specifies one or more parameters for the query, and in one embodiment specifies keywords for the search of the underlying data model. The WHERE clause may contain any expressions involving any of the above-mentioned columns except for UROWID and sub-queries. Also, the GROUP BY clause is not allowed. The VALUE column has no data type explicitly associated with it but is mapped to a VarChar data type to be described and exported to standard SQL front end tools.

In order to narrow the lookup scope, the WHERE clause may specify constraints against the SCHEMA, TABLE and COLUMN virtual table columns. While processing the request, only those columns from archive tables which type satisfy the semantic correctness of the WHERE clause condition will be considered as the lookup candidates. Optionally, an ORDER BY clause may refer to SCHEMA and/or TABLE and/or COLUMN, and specify the ordering of the result set by column.

In addition, the type of columns optionally may be specified that are to be involved in the lookup by using function CheckType(<column>, <TYPE SPEC>). This function returns 1 if <column> has type of <TYPE SPEC> and 0 otherwise. <TYPE SPEC> specifies the type as one of the following: INTEGER; SMALLINT; DECIMAL[(prec[, scale])]—if prec or scale not specified, the type is not verified against the missing part; DOUBLE; REAL; CHARACTER [(wid)]—if wid not specified, the type is not verified against the missing part; VARCHAR[(wid)]—if wid not specified, the type is not verified against the missing part; DATE; TIME; or TIMESTAMP. Alternatively, the type verification function can be specified as: TYPE (<column>)=/< ><TYPE_SPEC> or TYPE (<column>) in/not in (<TYPE_SPEC>[, <TYPE_SPEC>, <TYPE_SPEC>, . . . ]).

By way of example, suppose the desired query will discover the values for which the rightmost four characters of each database entry, converted into integers, is greater than 10. In addition, the query will limit to tables which names contain CLT and inside the columns which names end in ID and which are of CHAR/VARCHAR/INTEGER/SMALLINT types only. Finally, the result should be sorted by table name in ascending order and by column name in descending order.

The corresponding SQL query would be:

```
1  SELECT "table", "column", "urowid", "value"
2  FROM DATA_DISCOVERY.FAS_DD
3  WHERE "table" LIKE '%CLT%' and column LIKE '%ID' and
4  checktype( "column" ) in ( CHAR, VARCHAR, INTEGER,
   SMALLINT ) and
5  int(right( char(value), 4) ) > 10
6  ORDER BY "table", "column" desc;
```

In line 1, the SELECT clause is indicated and will limit the query to the columns TABLE, column, UROWID, and VALUE. Line 2 indicates the FROM clause, and indicates the DATA_DISCOVERY.FAS_DD virtual table, having a table definition as set forth above. Line 3 indicates the beginning of the WHERE clause, and indicates that the table names should be limited to those that have "CLT" in the title (% being wild cards on each side of "CLT") and column names limited to those that end in ID (% as wild card before ID). Line 4 indicates that columns of the type CHAR, VARCHAR, INTEGER, and SMALLINT should be returned. Line 5 indicates that values for which the rightmost four characters converted into integers will be greater than 10. Line 6 indicates that the results will first be ORDERED BY table (ascending as default), and then by column (descending).

A second example is the SQL query:

```
1  SELECT *
2  FROM DATA_DISCOVERY.FAS_DD
3  WHERE int( substr( char("value"), 2, 3 ) ) between 100 and 300;
```

Figure 13:
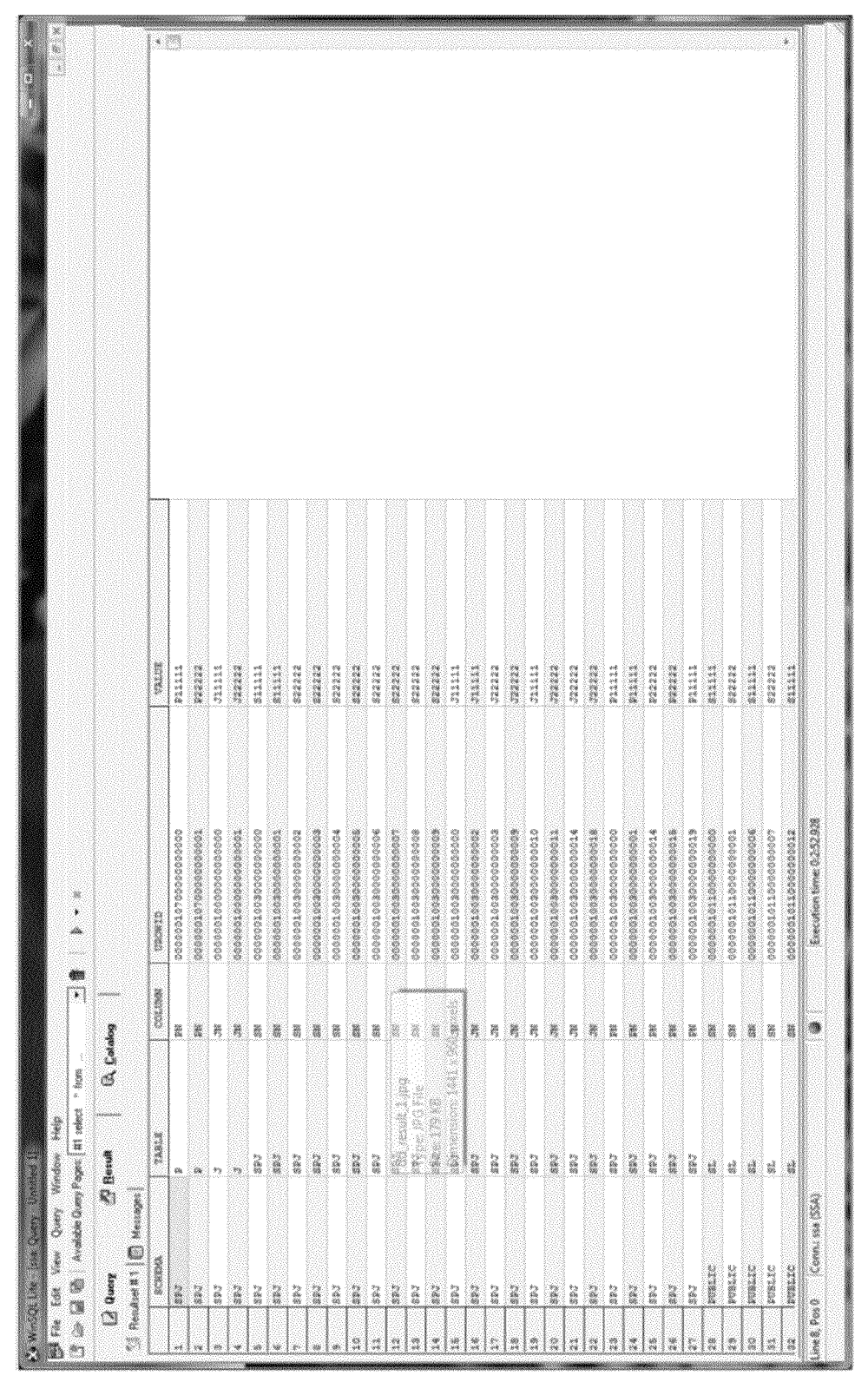

In this example, all columns are selected (*), the DATA_DISCOVERY.FAS_DD virtual table is specified as above, and the data returned should be limited to integers with a value between 100 and 300 based on three (3) characters starting at the second (2) character in the value. The results that are returned by the result processing module 1190 after step 1260 for this example are shown in FIG. 13. Note that in the VALUE column, each value fits the above constraints, namely that starting with the second character, the next three characters have a value between 100 and 300. E.g., for row 1 value P11111 the value (underlined) is 111, for row 2, value P22222, the value (underlined) is 222, etc.

Referring again to FIG. 12, the query received 1220 is next translated 1230 into a set of data model queries. This step is performed by query translation module 1185 according to one embodiment. The data model queries are generated based on the search parameters specified in the WHERE clause, type checks (if any), and the underlying data model as specified by the definition of the virtual table. These queries rely upon the inter-relationship between domains and columns, as described elsewhere herein.

More specifically, a given search request is first parsed such that its constraints are classified into two groups: search expressions and data model scope. Search expressions are the constraints applied to the VALUE column of the virtual table DATA_DISCOVERY.FAS_DD. The data model scope includes the constraints applied to the SCHEMA_NAME, TABLE_NAME, OR COLUMN_NAME columns of the virtual table. Next, the search scope is defined. The search expression is evaluated to identify potential data type constraints for search pruning. For example, if the constant is of the type "Alpha Numeric," which could not be translated into a Numeric or Date/Time data type, it is possible to eliminate from the search scope any Numerical or Date/Time domain/column data type. Continuing the search scope definition, the data model scope constraints, in conjunction with the data type constraint noted above, are applied to the data model to define the scope of the search. A look up request is executed on the system catalog to identify each potential column to analyze:

```
SELECT Schema_Name, Table_Name, Column_Name,
  Domain_Name, DataType
FROM Systems.Columns
WHERE
  Schema_Name Constraint
  Table_Name Constraint
  Column_Name Constraint
  DataType Constraint
  ORDER BY Domain_Name, Schema_Name,
  Table_Name, Column_Name
```

Next, the search request is executed:

```
For each Domain Di
  Execute the search expression to select the list of unique values
  which qualify named
  Di.ESV
    For Each Column Cj in Di
      Form a query in the form of
      INSERT INTO "Data_Discovery"."Fas_DD" ("Schema", "Table",
      "Column", "uRowId", "Value")
        SELECT 'Schema_Name', 'Table_Name', 'Column_Name',
        RowId, Column_Name
        FROM Schema_Name.Table_Name
        WHERE Column_Name in Di.ESV
```

By way of example, assume the following table/column/domain structure:

```
Create Domain D1 Char(10);
Create Domain D2 Dec(6,0);
Create Domain D3 Char(6);
Create Table T1 (
    C1 D1,
    C2 D2);
Create Table T2 (
    CC1 D1,
    CC2 D3);
Create Table T3 (
    CCC1 D1,
    CCC2 D2,
    CCC3 D3);
```

FIG. 14 shows these three tables, i.e., T1, T2, and T3. The tables have been simplified to three rows each for purposes of this example.

In this example, the SQL query is:

```
1   SELECT *
2   FROM DATA_DISCOVERY.FAS_DD
3   WHERE VALUE LIKE '%10%';
```

Using this query, the data model queries that the received query is translated 1230 into are as follows:

```
SELECT Schema, Table, Column, UROWID, VALUE
FROM T1
WHERE C1 in (SELECT VALUE FROM D1 WHERE
VALUE LIKE '%10%')
UNION All
SELECT Schema, Table, Column, UROWID, VALUE
FROM T2
WHERE CC1 in (SELECT VALUE FROM D1 WHERE
VALUE LIKE '%10%')
UNION All
SELECT Schema, Table, Column, UROWID, VALUE
FROM T3
WHERE CCC1 in (SELECT VALUE FROM D1 WHERE
VALUE LIKE '%10%')
UNION All
SELECT Schema, Table, Column, UROWID, VALUE
FROM T1
WHERE C2 in (SELECT VALUE FROM D2 WHERE
VALUE = 10)
UNION All
SELECT Schema, Table, Column, UROWID, VALUE
FROM T3
WHERE CCC2 in (SELECT VALUE FROM D2 WHERE
VALUE =10)
UNION All
SELECT Schema, Table, Column, UROWID, VALUE
FROM T2
WHERE CCC2 in (SELECT VALUE FROM D3 WHERE
VALUE LIKE '%10%')
UNION All
SELECT Schema, Table, Column, UROWID, VALUE
FROM T3
WHERE CCC3 in (SELECT VALUE FROM D3 WHERE
VALUE LIKE '%10%')
```

For D2, where the data is of type DEC (decimal), in the translation the value is stated as "=10" instead of "%10%" as used in the CHAR (character strings). The replicated sub-queries (shown in parentheses) for a specific domain are executed only once to produce an entity selection vector (ESV). The ESV is then used on each table specified in the WHERE clause including a column associated with the domain to produce a row selection vector (RSV), e.g., via the process described in conjunction with FIG. 8a. The data shown in FIG. 8a corresponds to Domain D1 from the above example.

The result set for this example (i.e., the result of step 1260) is shown in FIG. 16, and will be described in greater detail in conjunction with step 1260 below.

Once the received query is translated 1230 into data model queries, the data model is searched 1240 using the data model queries. According to one embodiment, the data model queries are provided 1245 as input into 602 of the search process as described in conjunction with FIG. 6. In this embodiment, the search modules 1130 provide the search functionality as described elsewhere herein. In this embodiment, the search is processed as in FIG. 6, and then results of the search are received 1250 from the search process.

Finally, the results of the data model queries are processed 1260 to produce a result set. This step is performed by result processing module 1190 according to one embodiment. One such result set was shown in FIG. 13, described above. In addition, the result set for the data model queries shown above is shown in FIG. 15. That result set has five columns: SCHEMA, TABLE, COLUMN, UROWID, and VALUE. Recall from the example that the parameter specified was WHERE "VALUE LIKE '%10%'." Each row in the result set thus has a value that includes the digits 10 in it, in any location for D1 and D3 (character strings) and value equal to 10 for D2 (decimal). Thus, the result set shown in FIG. 16 provides the SCHEMA, TABLE, COLUMN, UROWID, and VALUE for each value from T1, T2, and T3 that met the parameter "%10%" (D1 and D3) or "=10" (D2).

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the present invention.

What is claimed is:

1. A computer-implemented method of searching a data model using a virtual table, comprising:
   storing in a database a definition of a virtual table that is a view into a data model of the database represented in a domain structure;
   receiving a query by the database, the query indicating the virtual table, selecting one or more columns of the virtual table, and specifying one or more search parameters for the query;
   translating the received query into a set of data model queries for searching the data model, using the one or more selected columns of the virtual table and the one or more specified search parameters and the virtual table definition;
   searching one or more compressed tokenized data segments stored in the data model based on the set of data model queries to produce data model query results; and
   processing the data model query results based on the selected one or more columns of the virtual table to produce a result set table comprising a schema column, a table column, a column column, a urowid column, and a value column and a plurality of rows corresponding to each urowid in the result set table.

2. The method of claim 1, wherein the domain structure maps to columns and rows of the data model.

3. The method of claim 1, wherein the virtual columns comprise schema, table, column, urowid, and value.

4. The method of claim 1, wherein the received query is a SQL query.

5. The method of claim 4, wherein the SQL query is a keyword query.

6. The method of claim 1, wherein the received query comprises a parameter specifying one or more type checks.

7. The method of claim 1, wherein the received query comprises a parameter specifying ordering of the result set.

8. The method of claim 1, wherein searching the one or more compressed segments of data values stored in the data model further comprises:
   selecting a compacted file that may include a datum corresponding to the set of data model queries, the compacted file created from the one or more compressed tokenized data segments and segment metadata;
   accessing the selected compacted file;
   selecting a compressed segment from the one or more compressed tokenized data segments using the segment metadata;
   generating a decompressed segment from the selected compressed segment; and
   searching the decompressed segment to determine if the decompressed segment includes the datum corresponding to the set of data model queries.

9. The method of claim 8, further comprising:
   generating a domain structure and tokenized data from archive data;
   determining metadata from the tokenized data;
   generating a set of bit vectors from the tokenized data; and
   creating one or more compacted files from the set of bit vectors, the selected compacted file selected from the one or more compacted files.

10. The method of claim 9, wherein creating one or more compacted files further comprises storing the compressed tokenized data segments in the one or more compacted files.

11. The method of claim 1, wherein the set of data model queries are provided to a separate search process, which performed the searching and returns the data model query results.

12. The method of claim 1, wherein the translating the received query into a set of data model queries for searching the data model further comprises:
   parsing received query into search expressions constraints and data model scope constraints;
   identifying potential data type constraints in the search expressions constraints; and
   defining the scope of the set of data model queries by applying the data model scope constraints and data type constraints to the data model.

13. A system for searching a data model using a virtual table, comprising:
   a database storing a definition of a virtual table that is a view into a data model of the database represented in a domain structure;
   a virtual table module for receiving a query, the query indicating the virtual table, selecting one or more columns of the virtual table, and specifying one or more search parameters for the query;

a query translation module for translating the received query into a set of data model queries for searching the data model, using the one or more selected columns of the virtual table and the one or more specified search parameters and the virtual table definition;

a search module for searching one or more compressed tokenized data segments stored in the data model based on the set of data model queries to produce data model query results; and a result processing module for processing the data model query results based on the selected one or more columns of the virtual table to produce a result set table comprising a schema column, a table column, a column column, a urowid column, and a value column and a plurality of rows corresponding to each urowid in the result set table.

14. The system of claim 13, wherein the virtual columns comprise schema, table, column, urowid, and value.

15. The system of claim 13, wherein the received query is a SQL query.

16. The system of claim 13, wherein the received query comprises a parameter specifying one or more type checks.

17. The system of claim 13, wherein the received query comprises a parameter specifying ordering of the result set.

18. The system, of claim 13, the search module further comprising:

an identify files module for selecting a compacted file that may include a datum corresponding to the set of data model queries, the compacted file created from the one or more compressed tokenized data segments and segment metadata; and a search agent module for accessing the selected compacted file, selecting a compressed segment from the one or more compressed tokenized data segments using the segment metadata, generating a decompressed segment from the selected compressed segment, and searching the decompressed segment to determine if the decompressed segment includes the datum corresponding to the set of data model queries.

19. The system of claim 13, wherein the query translation module is further configured for parsing received query into search expressions constraints and data model scope constraints, identifying potential data type constraints in the search expressions constraints, and defining the scope of the set of data model queries by applying the data model scope constraints and data type constraints to the data model.

20. A computer program product, configured for execution on a computer device, and comprising computer executable instructions for causing the computer device to performed the following steps:

storing in a database a definition of a virtual table that is a view into a data model of the database represented in a domain structure;

receiving a query by the database, the query indicating the virtual table, selecting one or more columns of the virtual table, and specifying one or more search parameters for the query;

translating the received query into a set of data model queries for searching the data model, using the one or more selected columns of the virtual table and the one or more specified search parameters and the virtual table definition;

searching one or more compressed tokenized data segments stored in the data model based on the set of data model queries to produce data model query results; and processing the data model query results based on the selected one or more columns of the virtual table to produce a result set table comprising a schema column, a table column, a column column, a urowid column, and a value column and a plurality of rows corresponding to each urowid in the result set table.

21. The computer program product of claim 20, wherein the virtual columns comprise schema, table, column, urowid, and value.

22. The computer program product of claim 20, wherein the received query is a SQL query.

23. The computer program product of claim 20, wherein the received query comprises a parameter specifying one or more type checks.

24. The computer program product of claim 20, wherein the received query comprises a parameter specifying ordering of the result set.

25. The computer program product of claim 20, further comprising computer executable instructions for causing the computer device to performed the following steps:

parsing received query into search expressions constraints and data model scope constraints;

identifying potential data type constraints in the search expressions constraints; and defining the scope of the set of data model queries by applying the data model scope constraints and data type constraints to the data model.

\* \* \* \* \*

UNITED STATES PATENT AND TRADEMARK OFFICE
CERTIFICATE OF CORRECTION

PATENT NO. : 8,886,617 B2  
APPLICATION NO. : 13/891190  
DATED : November 11, 2014  
INVENTOR(S) : Richard Grondin and Vassiliy Zarouba Page 1 of 1

It is certified that error appears in the above-identified patent and that said Letters Patent is hereby corrected as shown below:

Claims

At Column 20, line 39, Claim 25, after "device to" delete "performed" and replace with "perform"

Signed and Sealed this  
Fifth Day of January, 2016

Michelle K. Lee  
*Director of the United States Patent and Trademark Office*